(12) United States Patent
Nakamura

(10) Patent No.: US 8,339,923 B2
(45) Date of Patent: Dec. 25, 2012

(54) OBJECTIVE OPTICAL ELEMENT AND OPTICAL PICKUP DEVICE

(75) Inventor: Kentarou Nakamura, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 7 days.

(21) Appl. No.: 13/139,697

(22) PCT Filed: Dec. 15, 2009

(86) PCT No.: PCT/JP2009/070887
§ 371 (c)(1),
(2), (4) Date: Jun. 14, 2011

(87) PCT Pub. No.: WO2010/071125
PCT Pub. Date: Jun. 24, 2010

(65) Prior Publication Data
US 2011/0317539 A1    Dec. 29, 2011

(30) Foreign Application Priority Data
Dec. 17, 2008    (JP) .................................. 2008-320423

(51) Int. Cl.
*G11B 7/00* (2006.01)
(52) U.S. Cl. ............................. 369/112.08; 369/112.26
(58) Field of Classification Search .................... None
See application file for complete search history.

(56) References Cited

U.S. PATENT DOCUMENTS

| 7,672,212 | B2 * | 3/2010 | Nakamura et al. ....... 369/112.12 |
| 2004/0037204 | A1 * | 2/2004 | Takeuchi ................. 369/112.08 |
| 2004/0047269 | A1 * | 3/2004 | Ikenaka et al. ........... 369/112.08 |
| 2008/0013412 | A1 * | 1/2008 | Nomura et al. ............ 369/44.11 |
| 2008/0013415 | A1 * | 1/2008 | Nomura et al. ............ 369/44.23 |

FOREIGN PATENT DOCUMENTS

| JP | 2004-103216 | 4/2004 |
| JP | 2005-306627 | 11/2005 |
| JP | 2009-134841 | 6/2009 |
| WO | WO 2007/105592 | 9/2007 |
| WO | WO 2008/007553 | 1/2008 |

* cited by examiner

*Primary Examiner* — Paul Huber
(74) *Attorney, Agent, or Firm* — Cozen O'Connor

(57) ABSTRACT

Provided is an objective optical element which can appropriately correct degradation from spherical aberration upon fluctuation of a light source wavelength while maintaining light use efficiency, just by changing the magnification of the objective optical element, and which can record/reproduce information to/from different optical discs. Also provided is an optical pickup device using the objective optical element. When a light flux having two different wavelengths $\lambda_{11}$, $\lambda_{12}$ (wherein $\lambda_{11} < \lambda_{12}$ and $\lambda_{12} - \lambda_{11} = 5$ nm) within a range of wavelength $\lambda_1$ is introduced to the objective optical element to measure the wavefront aberration, the following third order and fifth order spherical aberrations in unit of $\lambda$rms are obtained: $SA3(\lambda_{11})$, $SA5(\lambda_{11})$, $SA3(\lambda_{12})$, $SA5(\lambda_{12})$. If $\Delta SA3 = |SA3(\lambda_{12}) - SA3(\lambda_{11})|$, $\Delta SA5 = |SA5(\lambda_{12}) - SA5(\lambda_{11})|$, the following expression is satisfied: $0.18 > \Delta SA3 > \Delta SA5 > 0$ (1).

15 Claims, 5 Drawing Sheets

GRAPH OF FLUCTUATION IN DIFFRACTION EFFICIENCY WHEN $\lambda 0 = 405$

OBJECTIVE OPTICAL ELEMENT AND OPTICAL PICKUP DEVICE

RELATED APPLICATIONS

This application is a U.S. National Phase Application under 35 USC 371 of International Application PCT/JP2009/070887 filed Dec. 15, 2009.

This application claims the priority of Japanese application No. 2008-320423 filed Jan. 17, 2008, the entire content of which is hereby incorporated by reference.

TECHNICAL FIELD

The present invention relates to an optical pickup device which can record and/or reproduce information compatibly for various types of optical discs, and to an objective lens for use in the same.

BACKGROUND ART

In recent years, research and development of a high density optical disc system capable of recording and/or reproducing information (hereinafter, "record and/or reproduce" will be referred as "record/reproduce") by using a blue-violet semiconductor laser with a wavelength of about 400 nm, are advancing rapidly. As an example, in the case of an optical disc on which information is recorded and/or reproduced under the specifications that NA is 0.85 and a light source wavelength is 405 nm, namely, in the case of the so-called Blu-ray Disc (hereinafter, BD), it is possible to record information of 25 GB per layer for an optical disc with a diameter of 12 cm, which is same in size as DVD (NA is 0.6, wavelength of a light source is 650 nm, and memory capacity is 4.7 GB).

In the meantime, a value as a product for an optical disc player/recorder (optical information recording and reproducing apparatus) is not sufficient when the optical disc player/recorder only can record and/or reproduce information properly for the high density disc of this kind. In view of the realities that DVDs and CDs (Compact Discs) on which various types of information are recorded are on the market at present, only conducting information recording and/or information reproducing for the high density optical disc is not sufficient, and ability to conduct information recording and/or information reproducing properly also for DVDs and CDs owned by users, for example, enhances commercial value of the optical disc player/recorder for the high density optical disc. With the aforesaid background, an optical pickup device to be built in the optical disc player/recorder for a high density optical disc is requested to have capability to conduct information recording and/or information reproducing properly for any of high density optical discs, DVDs, and CDs, while maintaining compatibility.

As a method which enables to record and/or reproduce information adequately for any of high density optical discs and DVDs and further for CDs with maintaining compatibility, there can be considered a method to selectively switch an optical system for high density optical discs and an optical system for DVDs and CDs, corresponding to the recording density of an optical disc on which information will be recorded and/or reproduced. However, it is disadvantageous for the size-reduction and increases the cost, because it requires a plurality of optical systems.

Accordingly, in order to simplify the structure of an optical pickup device and to intend the reduction of cost, it is preferable to make an optical system for high density optical discs and an optical system for DVDs and CDs into a common optical system, and to reduce the number of optical parts constructing the optical pickup device as much as possible, even in the optical pickup device with compatibility. Then, providing the common objective optical element which is arranged with facing an optical disc, is most advantageous for simplification of the construction and cost reduction of the optical pickup device. Here, in order to obtain an objective optical element which can be commonly used for plural kinds of optical discs for which different recording/reproducing wavelengths are used, it is required that a dill active structure having a wavelength dependency in spherical aberration, is formed in the objective optical system, to reduce spherical aberrations caused by a difference in wavelength and a difference in thickness of protective layers.

Patent Literature 1 discloses an objective optical element for recording and/or reproducing information compatibly for high density optical discs and conventional DVDs and CDs.

CITATION LIST

Patent Literature

Patent Literature 1: JP-B No. 4033239

SUMMARY OF INVENTION

Technical Problem

Generally, wavelength of a light flux used for recording/reproducing information for a BD is 405 nm, which is shorter than wavelengths of light fluxes used for recording/reproducing information for a DVD and CD, and NA of an objective lens for a BD is 0.85, which is a higher NA in comparison with the NA of 0.65 of an objective lens for a DVD. Accordingly, in an example that wavelength fluctuation is caused in a light source, spherical aberration caused when a BD is employed is greater than that caused when a DVD is employed. A concrete example is provided below. Under the assumption that they are compared using the ratio of NA and wavelength simply, spherical aberrations are proportional to the fourth power of NA. Spherical aberration caused when a BD is employed is the about six times greater than that caused when a DVD is employed, where the about six times is given by $(0.85/0.60)^4 * 660/405$, and that is required to be corrected by some kind of means.

In this situation, a diffractive structure can be employed to correct spherical aberration which is caused corresponding to a wavelength fluctuation. However, in a common objective optical element for realizing compatibility and for converging light fluxes on information recording surfaces of different optical discs, a diffractive structure for realizing compatibility is arranged in a common area where both light fluxes are commonly used for recording and reproducing information, and specifications of the diffractive structure are naturally fixed for achieving the compatibility. Therefore, spherical aberration is hardly controlled corresponding to wavelength fluctuation, which is a problem. Especially, when the compatible objective optical element is made of a single lens in order to promote the reducing cost, a degree of the freedom of the design of a diffractive structure is limited more strictly in comparison with an objective optical element composed of plural lenses and with an objective optical element exclusively for a BD. Therefore, it can enlarge a possibility that the spherical aberration corresponding to wavelength fluctuation, which is a problem.

To solve them, the inventor has focused on the way to change the magnification by moving, for example, a collimation lens arranged at a position between a light source and an objective lens in the direction of the optical axis and to utilize the correction of spherical aberration resulting from that. Such the collimation lens which is movable in the direction of the optical axis as described above has been equipped already as a standard component in many optical pickup devices which can record/reproduce information for a multi-layer optical disc. By using the collimation lens for the correction, increase of excessive cost can be controlled, which is advantageous.

As for spherical aberrations, there are third-order spherical aberration, fifth-order spherical aberration, and higher-order spherical aberrations whose order is seventh or more. Among them, the third-order spherical aberration and the fifth-order spherical aberration mainly affect the shape of a converged spot. When the magnification is changed, there is caused a trend that the third-order spherical aberration and the fifth-order spherical aberration change in the same direction and that their change amounts becomes smaller as the order becomes higher, as represented by the third-order spherical aberration>the fifth-order spherical aberration>the seventh-order spherical aberration> . . . . Additionally, the change amount of the spherical aberrations whose order is seventh or more is microscopic in comparison with the change amounts of the third-order and fifth-order spherical aberration. Therefore, it can be said that the magnification can change only the third-order spherical aberration and the fifth-order spherical aberration.

However, Patent Literature 1 does not disclose a problem to correct both of the third-order spherical aberration and the fifth-order spherical aberration. Further, it still does not disclose a way to use the magnification change for the correction. In the objective optical element in Patent Literature 1, there is used a high-order diffractive structure. However, using a high-order diffractive structure causes a problem that fluctuation in diffractive efficiency becomes large when wavelength and temperature fluctuate, and an optical pickup device becomes difficult to handle. To explain the problem in concrete, when the form of the diffractive structure is designed to be optimized to the $m_o$-th diffracted light at the wavelength λo, diffraction efficiency $\eta_{mo}$, of the $m_o$-th diffracted light generated when light with wavelength λ passes through a phase difference providing structure is represented by the following expression.

$$\eta_{m0} = \sin c^2 [m_0(\lambda_0/\lambda - 1)]$$ [Math. 1]

As can be seen from FIG. 1 representing Math. 1 graphically, under the condition that the reference wavelength is λo=405 nm and a light flux with wavelength, for example, of ±10 nm of the reference wavelength enters the structure, deterioration in efficiency of the second-order diffracted light is about 1%. On the other hand, deterioration in efficiency of the fifth-order diffracted light is about 5% and deterioration in efficiency of the eighth-order diffracted light is as much as about 13%. If the efficiency of the diffracted light is remarkably deteriorated, there is a possibility that information is not recorded and/or reproduced for an optical disc adequately.

The present invention has been achieve in view of the above problems, and is aimed to provide an objective optical element and an optical pickup device employing the same, where the objective optical element can preferably correct a deterioration of spherical aberration caused when the wavelength of a light source changes and can control fluctuation in diffraction efficiency resulting from temperature change to be small when the wavelength changes, to realize information recording/reproducing adequately for various optical discs.

Solution to Problem

An objective optical element described in item 1 is an objective optical element for use in an optical pickup device which comprises a first light source emitting a first light flux with a wavelength $\lambda_1$ (375 nm$\leq\lambda_1\leq$435 nm), a second light flux emitting a second light flux with a wavelength $\lambda_2$ ($\lambda_1<\lambda_2$), and an objective optical element, wherein the optical pickup device records and/or produces information by converging the first light flux onto an information recording surface of a first optical disc including a protective layer with a thickness t1 and converging the second light flux onto an information recording surface of a second optical disc including a protective layer with a thickness t2 (t1<t2) to record and/or reproduce information, using the objective optical element. The objective optical element is characterized in that the objective optical element is a single lens and comprises a central area including an optical axis and a peripheral area arranged around the central area, wherein a central-area diffractive structure is arranged in the central area, the first light flux which has passed through the central area is converged on the information recording surface of the first optical disc so that information can be recorded and/or reproduced, the second light flux which has passed through the central area is converged on the information recording surface of the second optical disc so that information can be recorded and/or reproduced, the first light flux which has passed through the peripheral area is converged on the information recording surface of the first optical disc so that information can be recorded and/or reproduced, the second light flux which has passed through the peripheral area is not converged on the information recording surface of the second optical disc so that information can be recorded and/or reproduced, and the objective optical element satisfies the following expressions, where SA3($\lambda_{11}$), SA5($\lambda_{11}$), SA3($\lambda_{12}$), and SA5($\lambda_{12}$) [unit: λrms] are third-order spherical aberrations and fifth-order aberrations obtained when light fluxes with two different wavelengths $\lambda_{11}$ and $\lambda_{12}$ being within the range of the wavelength $\lambda_1$ (where $\lambda_{11}<\lambda_{12}$ and $\lambda_{12}-\lambda_{11}$=5 nm) enter the objective optical element and wavefront aberrations are measured:

$$0.18 > \Delta SA3 > \Delta SA5 > 0 \quad (1)$$

wherein $\Delta SA3 = |SA3(\lambda_{12}) - SA3(\lambda_{11})|$ and $\Delta SA5 = |SA5(\lambda_{12}) - SA5(\lambda_{11})|$.

In a magnification correction, both of the third-order spherical aberration (SA3) and the fifth-order spherical aberration (SA5) fluctuate so as to have the same polarity, and the absolute values of the fluctuation amounts hold SA3>SA5. Thereby, when 0.18>ΔSA3>ΔSA5>0 is satisfied, the third-order spherical aberration and the fifth-order spherical aberration caused when the wavelength of the light source fluctuates can be reduced simultaneously by using the magnification change in one direction (in a direction to increase a convergent angle or increase a divergent angle). Especially, when the expression (1) is satisfied, the third-order spherical aberration and the fifth-order spherical aberration can be excellently corrected only by the magnification change. Therefore, employing such the objective optical element makes the optical pickup device simplified. Herein, there are a case that both of the value of SA3($\lambda_{12}$)−SA3($\lambda_{11}$)

and the value of $SA5(\lambda_{12})-SA5(\lambda_{11})$ become negative and a case that those become positive. Under the condition that the objective optical element is a plastic lens, when the both of the value of $SA3(\lambda_{12})-SA3(\lambda_{11})$ and the value of $SA5(\lambda_{12})-SA5(\lambda_{11})$ are negative, a change amounts of spherical aberrations caused when the temperature changes can be reduced, which is preferable. On the other hand, when both of the value of $SA3(\lambda_{12})-SA3(\lambda_{11})$ and the value of $SA5(\lambda_{12})-SA5(\lambda_{11})$ are positive, a possibility that a high-order diffractive structure is used can be reduced and a fluctuation in diffraction efficiency caused when wavelength or temperature changes can be avoided from being enlarged, which is preferable.

Further, considering a combination of an objective optical element and a collimation lens that achieves a magnification of ×11 as a general magnification of an optical system in an optical pickup device for, for example a BD, the change amount of the spherical aberration corresponding to the movement amount of the collimation lens is about 0.17 λrms/mm for SA3 and is about 0.03 λrms/mm for SA5. Therefore, when the fluctuation amounts of the spherical aberrations corresponding to wavelength change are kept within the expression (1), the movement amount of the collimation lens becomes about 1 mm, which does not harm downsizing of the optical pickup device. Additionally, under the above-described movement sensitivity of the collimation lens, it can be controlled enough on the order of tens micrometers and does not need an accurate drive control. Therefore, the cost reduction can be aimed.

An objective optical element described in item 2 is the objective optical element of claim 1 characterized by satisfying the following expression:

$$0.13 > \Delta SA3 > 0.03 > \Delta SA5 > 0 \qquad (1').$$

Further, when both of expressions $0.13 > \Delta SA3 > 0.08$ and $0.03 > \Delta SA5 > 0$ are satisfied, in the objective optical element which is a plastic lens, aberrations caused when the temperature changes can be reduced, which is preferable. Especially, when the central-area diffractive structure is not a structure composed of just one type of step structure which will be described later but is a structure in which two types of structures such as blaze structures are overlapped together, it increases the degree of freedom of designing so as to reduce aberrations caused when the temperature changes. Therefore, the both of the expressions $0.13 > \Delta SA3 > 0.08$ and $0.03 > \Delta SA5 > 0$ are satisfied easily. On the other hand, when the central-area diffractive structure is composed of just one type of single step structure, it is preferable that $0.09 > \Delta SA3 > 0.03 > \Delta SA5 > 0$ are satisfied.

An objective optical element described in claim 3 is the objective optical element of item 1 characterized by satisfying the following expression:

$$0.18 > \Delta SA3 > 0.06 > \Delta SA5 > 0 \qquad (1'').$$

An objective optical element described in item 4 is the objective optical element of any one of items 1 to 3 characterized by satisfying $\Delta SA3:\Delta SA5 = \alpha:1$, wherein the value of $\alpha$ satisfies $4 \leq \alpha \leq 9$.

The present inventor has found after his earnest study that, in the magnification correction carried out by moving a collimation lens, the ratio between changes of SA3 and SA5 is about 6:1. Accordingly, when the ratio $\Delta SA3:\Delta SA5 = \alpha:1$ ($4 \leq \alpha \leq 9$) is satisfied with the compatibility being maintained by optimizing the peripheral area, spherical aberrations can be corrected excellently only by the magnification change even under the condition that the wavelength fluctuates. Preferably, $5 \leq \alpha \leq 9$ is satisfied.

An objective optical element described in item 5 is the objective optical element of any one of items 1 to 4, characterized in that the objective optical element is used for the optical pickup device further comprising a third light source emitting a third light flux with a wavelength. $\lambda_3$ ($\lambda_2 < \lambda_3$), wherein the optical pickup device records and/or produces information by converging the third light flux onto an information recording surface of a third optical disc including a protective layer with a thickness t3 (t2<t3) to record and/or reproduce information, using the objective optical element, wherein the objective optical element further comprises an intermediate area arranged between the central area and the peripheral area, the first light flux which has passed through the central area is converged on the information recording surface of the first optical disc so that information can be recorded and/or reproduced, the second light flux which has passed through the central area is converged on the information recording surface of the second optical disc so that information can be recorded and/or reproduced, the third light flux which has passed through the central area is converged on the information recording surface of the third optical disc so that information can be recorded and/or reproduced, the first light flux which has passed through the intermediate area is converged on the information recording surface of the first optical disc so that information can be recorded and/or reproduced, the second light flux which has passed through the intermediate area is converged on the information recording surface of the second optical disc so that information can be recorded and/or reproduced, the third light flux which has passed through the intermediate area is not converged on the information recording surface of the third optical disc so that information can be recorded and/or reproduced, the first light flux which has passed through the peripheral area is converged on the information recording surface of the fast optical disc so that information can be recorded and/or reproduced, the second light flux which has passed through the peripheral area is not converged on the information recording surface of the second optical disc so that information can be recorded and/or reproduced, and the third light flux which has passed through the peripheral area is not converged on the information recording surface of the third optical disc so that information can be recorded and/or reproduced.

When the objective optical element is used commonly for recording/reproducing information for three different optical discs, the design of the objective optical element is further restricted and its degree of the freedom is reduced in order to achieve the compatibility, which furthermore enlarges the possibility that spherical aberrations are deteriorated corresponding to the fluctuation in wavelength. By applying the present invention, spherical aberrations corresponding to the fluctuation in wavelength can be corrected easily even in such the objective optical element for achieving compatibility.

An objective optical element described in item 6 is the objective optical element of any one of items 1 to 5, characterized by satisfying the following expressions, where $W(\lambda_{11})$ and $W(\lambda_{12})$ are wavefront aberrations obtained when light fluxes with the wavelength $\lambda_{11}$ and the wavelength $\lambda_{12}$ ($\lambda_{11} < \lambda_{12}$) enter the objective optical element and wavefront aberrations are measured:

$$\Delta W = W(\lambda_{12}) - W(\lambda_{11})$$

$$\Delta W = C_{SAL}(20\rho^6 + 6\beta\rho^4 - 6(3+\beta)\rho^2 + (4+\beta)) + SAH \quad (2),$$

where

W is a wavefront aberration (at a best focus) [$\lambda$rms], $\rho$ is a relative pupil diameter (under an assumption that a value at a center of an effective diameter is 0 and a value at a height of an outermost position is 1), $C_{SAL}$ is a coefficient of low-order spherical aberrations, SAH is spherical aberrations with seventh and more orders [$\lambda$rms], and $\beta$ is an arbitral value within a range of $0 \leq \beta \leq 4$.

In the expressions, SAH can be calculated by SAH= $(SA7^2 + SA9^2 + SA11^2 + \ldots)^{1/2}$.

An objective optical element described in claim 7 is the objective optical element of claim 6, characterized by satisfying the following expression:

$$-0.030 \leq SAH \leq 0.030 \quad (3).$$

When the value of SAH is kept in the range satisfying the expression (3), information can be recorded and/or reproduced properly, because it is sufficiently smaller than 0.070 $\lambda$rms which is the so-called Marechal criterion. Further, the spherical aberrations with seven and more orders can be reduced and loss of the light amount can be reduced.

An objective optical element described in claim 8 is the objective optical element of claim 6 or 7, characterized by satisfying the following expression:

$$0.00 < C_{SAL} < 0.03 \quad (4).$$

Under the condition that the coefficient of low-order spherical aberrations $C_{SAL}$ is kept in the range satisfying the expression (4), when the magnification change is provided for correcting spherical aberrations caused when the wavelength fluctuates, the resolution of the movement amount of; for example, the collimation lens can be enlarged to some degree. Therefore, an accurate drive control is not required and a cost reduction can be aimed. The following expression is more preferably satisfied.

$$0.01 < C_{SAL} < 0.03 \quad (4')$$

An objective optical element described in item 9 is the objective optical element of any one of items 1 to 8, characterized in that a diffracted light flux with a diffraction order other than a zero-th order has a maximum diffracted-light amount among diffracted light fluxes generated when the first light flux enters the central-area diffractive structure.

Because a diffracted light flux with a diffraction order other than a zero-th order is used as a diffracted light flux generated when the first light flux enters the objective optical element, the objective optical element of the present invention is different in shape and properties from an objective optical element exclusive for the first optical disc. Accordingly, the possibility that the spherical aberrations corresponding to the wavelength fluctuation is deteriorated increases. By applying the present invention, spherical aberrations corresponding to wavelength fluctuation can be corrected easily even in such the objective optical element.

An objective optical element described in item 10 is the objective optical element of any one of items 1 to 9, characterized by satisfying the following expression:

$$0 \leq |N*d(n-1)/\lambda_1| \leq 50 \quad (5),$$

where d is an average of step differences of ring-shaped zones [nm] of a diffractive structure arranged in the peripheral area, n is a refractive index of a material of the objective optical element at the wavelength $\lambda_1$, $\lambda_1$ is a wavelength [nm] of the first light flux, and N is a number of the ring-shaped zones of the diffractive structure arranged in the peripheral area.

When the expression (5) is satisfied, the power of the diffraction is so small to less affect the diffraction efficiency and the ratio $\Delta SA3:\Delta SA5 = \alpha:1$ ($4 \leq \alpha \leq 9$) can easily be satisfied. Herein, in order to satisfy $5 \leq \alpha \leq 9$, it is preferable to satisfy $0 \leq |N*d(n-1)/\|_1| \leq 25$. When a diffractive structure is arranged in the peripheral area, it is more preferable to satisfy $8 \leq |N*d(n-1)/\leq 18$.

An objective optical element described in item 11 is the objective optical element of item 10, characterized in that the peripheral area is a refractive surface, in the objective optical element.

An objective optical element described in item 12 is the objective optical element of item 10, characterized in that the peripheral area comprises a diffractive structure, in the objective optical element.

An optical pickup device described in item 13 is an optical pickup device comprising:

a first light source emitting a first light flux with a wavelength $\lambda_1$ (375 nm $\leq \lambda_1 \leq$ 435 nm);

a second light flux emitting a second light flux with a wavelength $\lambda_2$ ($\lambda_1 < \lambda_2$), and an objective optical element, wherein the optical pickup device records and/or produces information by converging the first light flux onto an information recording surface of a first optical disc including a protective layer with a thickness t1 and converging the second light flux onto an information recording surface of a second optical disc including a protective layer with a thickness t2 (t1<t2) to record and/or reproduce information, using the objective optical element. The optical pickup device is characterized in that the objective optical element is a single lens and comprises a central area including an optical axis and a peripheral area arranged around the central area, wherein a central-area diffractive structure is arranged in the central area, the first light flux which has passed through the central area is converged on the information recording surface of the first optical disc so that information can be recorded and/or reproduced, the second light flux which has passed through the central area is converged on the information recording surface of the second optical disc so that information can be recorded and/or reproduced, the first light flux which has passed through the peripheral area is converged on the information recording surface of the first optical disc so that information can be recorded and/or reproduced, the second light flux which has passed through the peripheral area is not converged on the information recording surface of the second optical disc so that information can be recorded and/or reproduced, and the objective optical element satisfies the following expressions, where $SA3(\lambda_{11})$, $SA5(\lambda_{11})$, $SA3(\lambda_{12})$, and $SA5(\lambda_{12})$ [unit: $\lambda$rms] are third-order spherical aberrations and fifth-order aberrations obtained when light fluxes with two different wavelengths $\lambda_{11}$ and $\lambda_{12}$ being within the range of the wavelength $\lambda_1$ (where $\lambda_{11} < \lambda_{12}$ and $\lambda_{12} - \lambda_{11} = 5$ nm) enter the objective optical element and wavefront aberrations are measured:

$$0.18 > \Delta SA3 > \Delta SA5 > 0 \quad (1)$$

wherein $\Delta SA3=|SA3(\lambda_{12})-SA3(\lambda_{11})|$ and $\Delta SA5|SA5(\lambda_{12})-SA5(\lambda_{11})|$.

An optical pickup device described in claim 14 is the optical pickup device of item 13, characterized by further comprising a third light source emitting a third light flux with a wavelength $\lambda_3$ ($\lambda_2<\lambda_3$), wherein the optical pickup device records and/or produces information by converging the third light flux onto an information recording surface of a third optical disc including a protective layer with a thickness t3 (t2<t3) to record and/or reproduce information, using the objective optical element, wherein the objective optical element further comprises an intermediate area arranged between the central area and the peripheral area, the first light flux which has passed through the central area is converged on the information recording surface of the first optical disc so that information can be recorded and/or reproduced, the second light flux which has passed through the central area is converged on the information recording surface of the second optical disc so that information can be recorded and/or reproduced, the third light flux which has passed through the central area is converged on the information recording surface of the third optical disc so that information can be recorded and/or reproduced, the first light flux which has passed through the intermediate area is converged on the information recording surface of the first optical disc so that information can be recorded and/or reproduced, the second light flux which has passed through the intermediate area is converged on the information recording surface of the second optical disc so that information can be recorded and/or reproduced, the third light flux which has passed through the intermediate area is not converged on the information recording surface of the third optical disc so that information can be recorded and/or reproduced, the first light flux which has passed through the peripheral area is converged on the information recording surface of the first optical disc so that information can be recorded and/or reproduced, the second light flux which has passed through the peripheral area is not converged on the information recording surface of the second optical disc so that information can be recorded and/or reproduced, and the third light flux which has passed through the peripheral area is not converged on the information recording surface of the third optical disc so that information can be recorded and/or reproduced.

An optical pickup device described in item 15 is the optical pickup device of item 13 or 14, characterized by further comprising a magnification changing means arranged at a position between the first light source and the objective optical element.

As the magnification changing means, there is preferably provided a combination of a coupling lens such as a collimation lens and a drive means for driving the coupling lens in the direction of the optical axis. The reason why is that a mechanism to move a coupling lens in the direction of the optical axis in order to cope with a two-layer or multi-layer optical disc has already been equipped as a standard member in many optical pickup devices which can handle a two-layer or multilayer optical discs, and the mechanism can be used also for the magnification changing means and can restrict cost increase of the optical pickup device. As an example of a coupling lens, there is preferably cited a collimation lens composed of a singe lens which is easily controlled in terms of decentration adjustment and is easily manufactured. Alternatively, there can be used a coupling lens composed of a single lens other than a collimation lens, a coupling lens composed of plural lenses, beam expander and a relay lens, as a coupling lens. Herein, when a collimation lens composed of a single lens is moved in the direction of the optical axis and both of the value of $SA3(\lambda_{12})-SA3(\lambda_{11})$ and the value of $SA5(\lambda_{12})-SA5(\lambda_{11})$ are negative, it is preferable that the collimation lens is moved so as to be close to the objective optical element when the wavelength is elongated. On the other hand, when a collimation lens composed of a single lens is moved in the direction of the optical axis and both of the value of $SA3(\lambda_{12})-SA3(\lambda_{11})$ and the value of $SA5(\lambda_{12})-SA5(\lambda_{11})$ are positive, it is preferable that the collimation lens is moved so as to be away from the objective optical element when the wavelength is elongated. As another example, from a view point of reducing the movement amount of the lens, there can be cited an embodiment that a positive lens and a negative lens are provided as a coupling lens and only the positive lens is moved in the direction of the optical axis, as a preferable embodiment. Alternatively, a liquid crystal device can be employed as the magnification changing means.

An optical pickup device relating to the present invention comprises at least two light sources including a first light source and a second light source. However, it may further comprise a third light source. The optical pickup device relating to the present invention comprises a light-converging optical system for converging the first light flux on an information recording surface of the first optical disc and for converging the second light flux on an information recording surface of the second optical disc. However, the light-converging optical system may be configured to converge the third light flux on an information recording surface of the third optical disc. The optical pickup device relating to the present invention comprises a light-receiving element for receiving light fluxes reflected on information recording surfaces of the first optical disc and the second optical disc. The optical pickup device may further comprise a light-receiving element for receiving light reflected on an information recording surface of the third optical disc. In other words, the present invention can be applied to an optical pickup device comprising two light sources and handling two discs of the first optical disc and the second optical disc and to an objective optical element for use in the same, and the present invention can be applied also to an optical pickup device comprising three light sources and handling the third optical disc additionally to the first optical disc and the second optical disc and to an objective optical element for use in the same. It can be naturally applied to an optical pickup device handling four or more discs and to an objective optical element for use in the same.

The first optical disc has a protective substrate with a thickness of t1 and an information recording surface. The second optical disc has a protective substrate with a thickness of t2<t2) and an information recording surface. The third optical disc has a protective substrate with a thickness of t3 (t2<t3) and an information recording surface. Herein, it is preferable that the first optical disc is a BD (Blu-ray Disc), the second optical disc is a DVD, and the third optical disc is a CD. However, the discs are not limited to those. Each of the first optical disc, the second optical disc, and the third optical disc may be a multilayered optical disc including plural information recording layers. Herein, the thickness of the protective layer can have a value of zero. If a protective film with a thickness of several to several tens micrometers is applied on the optical disc, the thickness of the protective layer includes the thickness of the protective film.

As for a BD, information is recorded and/or reproduced with an objective optical element with NA of 0.85, and it has a protective layer with a thickness about 0.1 mm. Further, a DVD represents a generic name of optical discs wherein information is recorded and/or reproduced with an objective lens with NA in the range of about 0.60 to 0.67 and its protective layer has a thickness about 0.6 mm, and involves DVD-ROM, DVD-Video, DVD-Audio, DVD-RAM, DVD-R, DVD-RW, DVD+R and DVD+RW. In the present specification, a CD represents a generic name of optical discs wherein information is recorded and/or reproduced by an objective lens with NA in the range of about 0.45 to 0.53 and its protective layer has the thickness about 1.2 mm, and involves CD-ROM, CD-Audio, CD-Video, CD-R and CD-RW. As for a recording density, a BD has the highest recording density, and recording densities of a DVD and CD decrease in this order.

Thicknesses t1, t2, and t3 of the protective substrates preferably satisfy the following conditional expressions (6), (7), and (8). However, the thicknesses are not limited to them.

$$0.0750 \text{ mm} \leq t1 \leq 0.1125 \text{ mm} \quad (6)$$

$$0.5 \text{ mm} \leq t2 \leq 0.7 \text{ mm} \quad (7)$$

$$1.0 \text{ mm} \leq t3 \leq 1.3 \text{ mm} \quad (8)$$

The thickness of a protective substrate in this description means the thickness of a protective layer arranged on a surface of an optical disc. In other words, the thickness means the thickness of a protective substrate extending from the surface of an optical disc to an information recording surface at the closest position to the surface.

In the present specification, each of the first light source, the second light source and the third light source is preferably a laser light source. Lasers such a semiconductor laser and a silicon laser are preferably used for the laser light sources. The first wavelength $\lambda_1$ of the first light flux emitted from the first light source, the second wavelength $\lambda_2$ ($\lambda_2 > \lambda_1$) of the second light flux emitted from the second light source, and the third wavelength $\lambda_3$ ($\lambda_3 > \lambda_2$) of the third light flux emitted from the third light source are preferable to satisfy the following conditional expressions (9) and (10).

$$1.5 \times \lambda_1 < \lambda_2 < 1.7 \times \lambda_1 \quad (9)$$

$$1.8 \times \lambda_1 < \lambda_3 < 2.0 \times \lambda_1 \quad (10)$$

When a BD, DVD, and CD are employed as the first optical disc, the second optical disc, and the third optical disc, respectively, the wavelength $\lambda_1$ of the first light source is preferably 375 nm or more, and 435 nm or less, and is more preferably 390 nm or more, and 420 nm or less; the second wavelength $\lambda_2$ of the second light source is preferably 570 nm or more, and 680 nm or less, and is more preferably 630 nm or more, and 680 nm or less; and the third wavelength $\lambda_3$ of the third light source is preferably 750 nm or more, and 850 nm or less, and is more preferably 760 nm or more, and 820 nm or less.

Further, at least two light sources of the first light source, the second light source, and the third light source may be unitized. The unitization means fixing and housing, for example, the first light source and the second light source into one package. However, it is not limited to the above, the unitization in a broad sense involves a situation that two light sources are fixed so that aberration can not be corrected. Further, in addition to the light source, the light-receiving element which will be described later, may also be provided as one package.

As the light-receiving element, a photodetector such as a photodiode is preferably used. Light reflected on an information recording surface of an optical disc enters into the light-receiving element, and signal outputted from the light-receiving element is used for obtaining the read signal of information recorded in each optical disc. Further, a change in the light amount caused with a change in shape and a change in position of a spot on the light-receiving element are detected to conduct a focus detection and a tracking detection. Based on these detections, the objective optical element can be moved for focusing and tracking operations. The light-receiving element may be composed of a plurality of photodetectors. The light-receiving element may also have a main photo detector and secondary photo detector. For example, the light-receiving element is provided with a main photodetector which receives the main light used for recording and/or reproducing information, and two secondary photodetectors positioned on both sides of the main photo detector, so as to receive secondary light for tracking adjustment by the two secondary photodetectors. Alternatively, the light-receiving element may comprise a plurality of light-receiving elements corresponding to respective light sources.

The light-converging optical system comprises an objective optical element. Preferably, the light-converging optical system further comprises a coupling lens such as a collimation lens, additionally to the objective optical element. The coupling lens is arranged between the objective optical element and the light sources, and means a single lens or a lens group which changes divergent angle of a light flux. The collimation lens is a kind of coupling lens and is a lens to convert a light flux which has entered the collimation lens into a parallel light flux and to emit the resulting light. In the present specification, a magnification changing means can include a structure such that a coupling lens such as a collimation lens is moved in the direction of the optical axis, or a structure such that a light source is moved in the direction of the optical axis.

Further, the light-converging optical system may also comprise an optical element such as a diffractive optical element which divides a light flux emitted from a light source into a main light flux used for recording and reproducing information and two secondary light fluxes used for operations such as a tracking operation. In the present specification, an objective optical element means an optical system which is arranged to face an optical disc in an optical pickup device and has a function to converge a light flux emitted from a light source onto an information recording surface of the optical disc. The objective optical element may be a glass lens, a plastic lens or a hybrid lens in which a diffractive structure formed of photo-curable resin is arranged on a glass lens. The objective optical element preferably comprises a refractive surface which is an aspheric surface. Further, in the objective optical element, it is preferable that a base surface (also referred as a base aspheric surface) on which a diffractive structure is provided is an aspheric surface. The objective optical element of the present invention is a single lens.

Further, when the objective optical element is a glass lens, a glass material with glass transition point Tg of 500° C. or less is preferably used. The glass transition point Tg of 480° C. or less is more preferable. By using the glass material whose glass transition point Tg is 500° C. or less, the material can be molded at a comparatively low temperature. Therefore, the life of the mold can be prolonged.

Hereupon, a glass lens generally has larger specific gravity than a resin lens. Therefore, the objective optical element made of glass has larger mass and applies a larger burden to an actuator which drives the objective optical element. Therefore, when a glass lens is employed for the objective optical element, a glass material having small specific gravity is preferably used for the objective optical element. Specifically, the specific gravity is preferably 3.0 or less, and is more preferably 2.75 or less.

As examples of such a glass material, there can be cited Examples 1 to 12 in JP-A No. 2005-306627. For example, Example 1 in JP-A No. 2005-306627 exhibits grass transition point Tg of 460° C., the gravity of 2.58, refractive index nd of 1.594 and the Abbe number of 59.8.

Further, when a plastic lens is employed for the objective optical element, it is preferable that a resin material of cyclic olefins is used for the objective optical element. In the cyclic olefins, there is more preferably used the resin material having: a refractive index at the temperature 25° C. for wavelength 405 nm, which is within the range of 1.52 to 1.60; and a ratio of refractive index change dN/dT (° C.$^{-1}$) caused by a temperature change within the temperature range of −5° C. to 70° C. for the wavelength 405 nm, which is within the range of $-20 \times 10^{-5}$ to $-5 \times 10^{-5}$ (more preferably, $-10 \times 10^{-5}$ to $-8 \times 10^{-5}$). Further, when the objective optical element employs a plastic lens, it is preferable that the coupling lens also employs a plastic lens.

The Abbe number of the material forming the objective optical element is preferably 50 or more.

The objective optical element will be described below. At least one optical surface of the objective optical element comprises a central area and a peripheral area arranged around the central area. In the case that the objective optical element is applied to an optical pickup device comprising the third light source additionally to the first light source and the second light source, at least one optical surface of the objective optical element may comprise an intermediate area arranged between the central area and the peripheral area. The central area preferably is an area including the optical axis of the objective optical element. Alternatively, a finite area including the optical axis may be provided as a unused area or a special-use area, and the central area may be provided around the finite area. The central area, the intermediate area and the peripheral area are preferably arranged on the same optical surface. As shown in FIGS. 2a and 2b, it is preferable that the central area CN, intermediate area MD, and peripheral area OT are provided on the same optical surface concentrically around the optical axis as the center.

The central area of the objective optical element includes a central-area diffractive structure. The central-area diffractive structure may be composed of only one diffractive structure, or may be composed of plural diffractive structures which are overlapped together. The term "overlapped" means literally that the structures are superimposed with their centers agreeing with the optical axis. For example, there can be cited an embodiment that a blaze structure and a blaze structure which will be described later are overlapped together and an embodiment that a step structure which will be described later and a blaze structure are overlapped together.

If the objective optical element is applied to an optical pickup device comprising simply the first light source and the second light source, the peripheral area may be a refractive surface or an area on which an intermediate-area diffractive structure are arranged. If the objective optical element is applied to an optical pickup device comprising the third light source additionally to the first light source and the second light source, the intermediate area of the objective optical element preferably includes an intermediate-area diffractive structure. The intermediate-area diffractive structure may be composed of only one diffractive structure, or may be composed of plural diffractive structures which are overlapped together.

The peripheral area of the objective optical element may be a refractive surface or an area on which a peripheral-area diffractive structure are arranged.

The area where the central-area diffractive structure is provided is preferably 70% or more of the area of the central area on the objective optical element. It is more preferably 90% or more of the area of the central area. The central-area diffractive structure is furthermore preferably provided on the entire surface of the central area. The area where the intermediate-area diffractive structure is provided is preferably 70% or more of the intermediate area on the objective optical element. It is more preferably 90% or more of the area of the intermediate area. The intermediate-area diffractive structure is further more preferably provided on the entire surface of the intermediate area. The area where the peripheral-area diffractive structure is provided is preferably 70% or more of the peripheral area on the objective optical element. It is more preferably 90% or more of the area of the peripheral area. The peripheral-area diffractive structure is further more preferably provided on the entire surface of the peripheral area.

A diffractive structure used in the present specification, is a general name of a structure which includes step differences and makes at least a light flux with a certain wavelength convergent or divergent by diffractive action. For example, it involves a structure that is formed by plural unit forms which are arranged around the optical axis as their center (where the forms are also referred as ring-shaped structures) and that is configured to converge light in a way that a light flux enters respective unit forms and a wavefront of the light flux which has passed through the respective unit forms shifts by an almost integer multiple of wavelength or an integer multiple of wavelength at every neighboring ring-shaped zones to form a new wavefront. The diffractive structure preferably includes plural step differences. The step differences may be arranged along a direction perpendicular to the optical axis at periodic intervals, or may be arranged along a direction perpendicular to the optical axis at non-periodic intervals. If a single aspheric lens, which does not include an extra element such as a plate element additionally to an objective optical element with a light-converging action, is employed, incident angle of a light flux to the objective optical element depends on its height from the optical axis. Therefore, the amount of each step difference can slightly differ from the others.

It is preferable that the diffractive structure includes a plurality of concentric ring-shaped zones arranged around the optical axis as their center. Further, the diffractive structure can have various sectional shapes (sectional shapes in a plane including the optical axis), and the shapes are divided broadly into a blaze structure and a step structure, according to their sectional shape including the optical axis.

The blaze structure is a structure that, as shown in FIGS. 3a and 3b, an optical element with a diffractive structure has a sectional shape which includes the optical axis and has a serrated shape. The diffractive structure includes inclined surfaces which are not perpendicular to and are not parallel with a base aspheric surface. In examples shown in FIGS. 3a to 3d, it is assumed that the upper part points a side of the light source, the lower part points a side of the optical disc, and the diffractive structure is formed on a plane as a base aspheric surface.

The step structure is a structure that, as shown in FIGS. 3c and 3d, an optical element with a diffractive structure has a sectional shape which includes the optical axis and has a plurality of small stepped bodies (which are referred as step units). In the present specification, "X-level" means that, in one step unit in the step structure, ring-shaped surfaces (which is sometimes referred as optical functional surfaces) corresponding to surfaces extending in the direction perpendicular to the optical axis (facing the direction perpendicular to the optical axis) are divided with step differences to form a group of the X number of ring-shaped surfaces. Especially, a step structure of three or more levels includes small step differences and large step differences.

A diffractive structure shown in FIG. 3c is referred as a five-level step structure and a diffractive structure shown in FIG. 3d is referred as a two-level step structure. The two-level step structure includes a plurality of concentric ring-shaped zones arranged around the optical axis as the center, and the plurality of ring-shaped zones have a sectional shape which includes the optical axis of the objective optical element and is composed of plural step-difference surfaces Pa and Pb extending to be parallel with the optical axis, light-source-side optical functional surfaces Pc connecting light-source-side ends of neighboring step-difference surfaces Pa and Pb, and optical-disc-side optical functional surfaces Pd connecting optical-disc-side ends of neighboring step-difference surfaces Pa and Pb. Light-source-side optical functional surfaces Pc and optical-disc-side optical functional surfaces Pd are arranged alternately along the direction crossing the optical axis.

In the step structure, a length of one step unit in a direction perpendicular to the optical axis is referred as pitch P. Step-difference surfaces preferably extend to be parallel with or almost parallel with the optical axis. Optical functional surfaces may be parallel with the base aspheric surface, or may be inclined with respect to the base aspheric surface.

The diffractive structure preferably is a structure in which a certain unit form is repeated periodically. Herein, "a certain unit form is repeated periodically" naturally involves a form such that the same form is repeated on the same cycle. Further, "a certain unit form is repeated periodically" also involves a form such that unit forms each corresponding to one unit of the cycle are changed regularly such that their cycle is elongated gradually or shortened gradually.

When the diffractive structure has a blaze structure, it has a form that a serrated shape as a unit form is repeated. In the form, the same serrated shape may be repeated as shown in FIG. 3a, or a serrated shape becomes greater or smaller in size gradually as a position in the form goes further away from the optical axis. Alternatively, the form may be provided by combining a form that a serrated shape becomes greater in size gradually and a form that a serrated shape becomes smaller in size gradually. Herein, even in a form that a serrated shape changes in size gradually, it is preferable that the amount of step differences in the optical axis direction (or a direction where a passing ray travels) does not sufficiently change. Further, the form may have an area in which the step differences of the blaze structure face the opposite direction to the optical axis (the center), another area in which the step differences of the blaze structure face the direction of the optical axis (the center), and a transition area which is arranged between those areas and is required to switch the orientation of the step differences of the blaze structure. When an optical path difference provided by the diffractive structure is represented by an optical path difference function, the transition area corresponds to a point where the optical path difference function has an extreme value. When the optical path difference function has a point with an extreme value, the slope of the optical path difference function becomes small. It increases the pitches of the ring-shaped zones and controls the deterioration of transmittance of the diffractive structure because of its shape error.

When the diffractive structure has a step structure, it can have a form that, for example, the five-level step unit shown in FIG. 3c is repeated. Alternatively, the form may be a form that a step becomes greater or smaller in size gradually as the position goes further away from the optical axis. Herein, it is preferable that the amount of step differences in the optical axis direction (or a direction where a passing ray travels) does not sufficiently change.

When there is provided an intermediate-area diffractive structure in the intermediate area of the objective optical element or a peripheral-area diffractive structure in the peripheral area of the objective optical element, additionally to the central-area diffractive structure arranged in the central area of the objective optical element, those structures may be formed on the different optical surfaces of the objective optical element, but it is preferable that those are arranged on the same optical surface. By forming them on the same optical surface, the decentration error caused in a manufacturing process can be reduced, which is preferable. It is preferable that the central-area diffractive structure and the intermediate-area diffractive structure or peripheral-area diffractive structure are arranged on the light-source-side surface of the objective optical element rather than the optical-disc-side surface of the objective optical element.

The objective optical element converges each of the first light flux, the second light flux, and the third light flux each passing through the central area where the central-area diffractive structure is arranged, so as to form a converged spot. Preferably, the objective optical element converges the first light flux which passes through the central area where the central-area diffractive structure is arranged, onto an information recording surface of the first optical disc so that information can be recorded and/or reproduced on the information recording surface of the first optical disc. It is preferable that the objective optical element converges the second light flux which passes through the central area where the central-area diffractive structure is arranged, onto an information recording surface of the second optical disc so that information can be recorded and/or reproduced on the information recording surface of the second optical disc. It is preferable that the objective optical element converges the third light flux which passes through the central area where the central-area diffractive structure is arranged, onto an information recording surface of the third optical disc so that information can be recorded and/or reproduced on the information recording surface of the third optical disc. Under the condition that the objective optical element handles the third optical disc additionally to the first optical disc and the second optical disc, and that thickness t1 of the protective substrate of the first optical disc and thickness t2 of the protective substrate of the second optical disc are different in thickness from each other, it is preferable that the central-area diffractive structure corrects spherical aberration caused because of the difference between thickness t1 of the protective substrate of the first optical disc and thickness t2 of the protective substrate of the second optical disc and/or spherical aberration caused because of the difference in wavelength between the first light flux and the second light flux, for the first light flux and the second light flux each passing through the central-area diffractive structure. Further, it is preferable that the central-area diffractive structure corrects spherical aberration caused because of the difference between thickness t1 of the protective substrate of the first optical disc and thickness t3 of the protective substrate of the third optical disc and/or spherical aberration caused because of the difference in wavelength between the first light flux and the third light flux, for the first light flux and the third light flux each passing through the central-area diffractive structure.

Under the condition that the intermediate-area diffractive structure is arranged on the objective optical element, the objective optical element converges each of the first light flux and the second light flux each passing through the intermediate area by using the structure so as to form a converged spot. Preferably, the objective optical element converges the first light flux which passes through the intermediate area where the intermediate-area diffractive structure is arranged, onto an information recording surface of the first optical disc so that information can be recorded and/or reproduced on the information recording surface of the first optical disc. Under the condition that the intermediate-area diffractive structure is arranged on the objective optical element, it is preferable that the objective optical element converges the second light flux which passes through the intermediate area where the intermediate-area diffractive structure is arranged by using the structure, onto an information recording surface of the second optical disc so that information can be recorded and/or reproduced on the information recording surface of the second optical disc. It is preferable that the intermediate-area diffractive structure corrects chromatic spherical aberration caused because of the difference in wavelength between the first light flux and the second light flux.

As a preferable embodiment, there is cited an embodiment such that the third light flux which has passed through the intermediate area is not used for recording and/or reproducing information for the third optical disc. It is preferable that the third light flux which has passed through the intermediate area does not contribute to forming a converged spot on the information recording surface of the third optical disc. In other words, under the condition that the intermediate-area diffractive structure is arranged on the objective optical element, it is preferable that the third light flux passing through the intermediate area forms flare light through the structure on the information recording surface of the third optical disc. As shown in FIG. 4, in a spot formed on the information recording surface of the third optical disc when the third light flux passes through the objective optical element, there are provided, in order from the optical-axis side (or from a central spot portion) toward the outside, central spot portion SCN whose light amount density is high, the intermediate spot portion SMD whose light amount density is lower than that of the central spot portion, and the peripheral spot portion SOT whose light amount density is higher than that of the intermediate spot portion and lower than that of the central spot portion. The central spot portion is used for recording and/or reproducing information for the optical disc, and the intermediate spot portion and the peripheral spot portion are not used for recording and/or reproducing information for the optical disc. In the above description, this peripheral spot portion can be called flare light. However, also in the condition that the intermediate spot portion does not exist and the peripheral spot portion exists, around the central spot portion, in other words, the condition that weak light forms a large spot around the converged spot, the peripheral spot portion is referred as flare light, too. In other words, the third light flux which has passed through the intermediate-area diffractive structure arranged in the intermediate area of the objective optical element, forms the peripheral spot portion on the information recording surface of the third light flux.

As a preferable embodiment that the peripheral area is provided, there is cited an embodiment such that the first light flux which has passed through the peripheral area is used for recording and/or reproducing information for the first optical disc, and the second light flux and the third light flux which have passed through the peripheral area are not used for recording and/or reproducing information for the second optical disc and the third optical disc. It is preferable that the second light flux and the third light flux which have passed through the intermediate area do not contribute to forming a converged spot on the information recording surface of the second optical disc and the third optical disc. In other words, under the condition that the objective optical element includes the peripheral area, it is preferable that the second light flux and the third light flux passing through the peripheral area form flare light on the information recording surfaces of the second optical disc and the third optical disc. In other words, it is preferable that the second light flux and the third light flux which have passed through the peripheral area of the objective optical element, form a peripheral spot portion on the information recording surface of each of the second optical disc and the third optical disc, respectively.

When the central-area diffractive structure is formed by overlapping plural diffractive structures with different actions together, the direction of outgoing light can be changed for all the first light flux, the second light flux and the third light flux which have passed through the central-area diffractive structure. Therefore, even when all the first light flux, the second light flux, and the third light flux enter the objective optical element at the same image-forming magnification (for example, as all the light fluxes enters it as parallel light fluxes), aberrations generated because of using different types of optical discs can be corrected, which realizes compatibility.

The following description is a preferable condition required for the embodiment that, for example, the central-area diffractive structure is formed by overlapping a certain blaze structure (hereinafter, referred as the first basic structure) and anther blaze structure (hereinafter, the second basic structure) together. The first basic structure is a blaze structure as described above. The first basic structure makes the amount of X-th-order diffracted light of the first light flux which has passed through the first basic structure larger than the amount of diffracted light of any other orders. The first basic structure makes the amount of Y-th-order diffracted light of the second light flux which has passed through the first basic structure larger than the amount of diffracted light of any other orders. The first basic structure makes the amount of Z-th-order diffracted light of the third light flux which has passed through the first basic structure larger than the amount of diffracted light of any other orders. Herein, the value of X is preferably an odd integer. When the value of X is an odd number which is five or less, the amount of step differences of the first basic structure does not become excessively large. It makes its manufacturing process easy, controls the loss of light amount resulting from a manufacturing error, and reduces a fluctuation of diffraction efficiency caused when wavelength changes, which is preferable.

In the first basic structure formed in the central area, its step differences (surfaces parallel with the optical axis) preferably face the direction opposite to the optical axis.

As described above, when the first basic structure in which the diffraction order for the first light flux is an odd number is arranged with its step differences facing the direction opposite to the optical axis, a working distance can be ensured sufficiently when a CD is used, even in a thick objective optical element whose thickness along the optical axis as thick as it can be used for realizing compatibility between three types of optical discs of BD, DVD, and CD, which is preferable.

In a thick objective optical element whose thickness along the optical axis as thick as it can be used for realizing compatibility between three types of optical discs of BD, DVD, and CD, it is preferable that the first basic structure has paraxial power for the first light flux, from the view point to ensure a working distance sufficiently when a CD is used. Herein, the term "having paraxial power" means that, when the optical path difference function of the first basic structure is expressed by Math. 3 which will be described below, the value of B2h2 is not zero.

The second basic structure also is a blaze structure, as described above. The second basic structure makes the amount of L-th-order diffracted light of the first light flux which has passed through the second basic structure larger than the amount of diffracted light of any other orders. The second basic structure makes the amount of M-th-order diffracted light of the second light flux which has passed through the second basic structure larger than the amount of diffracted light of any other orders. The second basic structure makes the amount of N-th-order diffracted light of the third light flux which has passed through the second basic structure larger than the amount of diffracted light of any other orders. Herein, the value of L is preferably an even integer. When the value of L is an even number which is four or less, the amount of step differences of the second basic structure does not become excessively large. It makes its manufacturing process easy, controls the loss of light amount resulting from a manufacturing error, and reduces a fluctuation of diffraction efficiency caused when wavelength changes, which is preferable.

In the second basic structure formed in the central area, its step differences (surfaces parallel with the optical axis) preferably face the optical axis direction.

As described above, it is considered that the first basic structure in which the diffraction order for the first light flux is an odd number is arranged with its step differences facing the direction opposite to the optical axis, the second basic structure in which the diffraction order for the first light flux is an even number is arranged with its step differences facing the optical axis direction, and the first basic structure and the second basic structure are overlapped together. Employing the above structure restricts that height of step differences formed after they are overlapped together becomes excessively high, in comparison with the structure in which the first basic structure and the second basic structure are overlapped together with their step differences facing the same direction. Corresponding to that, loss of light amount resulting from a manufacturing error can be controlled and a fluctuation of diffraction efficiency when wavelength changes can be controlled, which is preferable.

The structure does not simply realize the compatibility between three types of optical discs of BD, DVD, and CD, but also enables to provide an objective optical element exhibiting well-balanced light use efficiency such that high light-use efficiency can be maintained for each of the three types of optical discs of BD, DVD, and CD. For example, there can be provided an objective optical element exhibiting diffraction efficiency of 80% or more for wavelength $\lambda 1$, diffraction efficiency of 60% or more for wavelength $\lambda 2$, and diffraction efficiency of 50% or more for wavelength $\lambda 3$. Further, there can be provided an objective optical element exhibiting diffraction efficiency of 80% or more for wavelength $\lambda 1$, diffraction efficiency of 70% or more for wavelength $\lambda 2$, and diffraction efficiency of 60% or more for wavelength $\lambda 3$. Furthermore, when step differences of the first basic structure face the direction opposite to the optical axis, aberration caused when the wavelength fluctuates toward the longer-wavelength side can be changed in the under (under-corrected) direction. Thereby, aberrations generated when the temperature of an optical pickup device increases can be controlled. Under the condition that the objective lens is made of plastic, an objective lens in which stable properties can be maintained even when the temperature changes can be provided.

In order that, under the condition that the objective lens is made of plastic, a stable properties is maintained even when the temperature changes, it is preferable that both of the third-order spherical aberration and the fifth-order spherical aberration caused in the objective lens when the wavelength increases are under (under-corrected).

A more preferable central-area diffractive structure is a structure formed by overlapping the first basic structure wherein the values of |X|, |Y|, and |Z| are 1, 1, and 1, respectively, and the second basic structure wherein the values of |L|, |M|, and |N| are 2, 1, and 1, respectively. By providing the above central-area diffractive structure, the height of step difference can be lowered. Accordingly, the manufacturing error can be more reduced, the loss of light amount can be further more reduced, and the fluctuation of diffraction efficiency caused when the wavelength changes can be controlled more preferably.

From the view point of the shape and the step difference amount of the central-area diffractive structure obtained after the first basic structure and the second basic structure are overlapped together, the central-area diffractive structure formed by overlapping the first basic structure wherein the values of |X|, |Y|, and |Z| are 1, 1, and 1, respectively, and the second basic structure wherein the values of |L|, |M|, and |N| are 2, 1, and 1, respectively, can be represented as follows. It is preferable that the central-area diffractive structure includes both of step differences facing the direction opposite to the optical axis and step differences facing the optical axis direction, and that step difference amount d11 of the step differences facing the direction opposite to the optical axis and step difference amount d12 of the step differences facing the optical axis direction satisfy the following conditional expressions. When the objective lens on which a diffractive structure is arranged is a single convex lens with an aspheric surface, the incident angle of a light flux to the objective lens depends on its height from the optical axis. Therefore, even when the diffractive structure provides a uniform optical path difference, the step difference amount tends to be greater as the position of the step difference is further away from the optical axis, generally. In the following conditional expressions, the upper limit is obtained by being multiplied by 1.5. That is because such increase of the step difference amount is considered. In the expressions, n represents a refractive index of the objective lens at the first wavelength $\lambda 1$.

$$0.6 \cdot (\lambda 1/(n-1)) < d11 < 1.5 \cdot (\lambda 1/(n-1))$$

$$0.6 \cdot (\lambda 1/(n-1)) < d12 < 1.5 \cdot (2\lambda 1/(n-1))$$

Under the condition that, for example, the values of $\lambda 1$ ranges from 390 nm to 415 nm (from 0.390 μm to 0.415 μm) and the value of n ranges from 1.54 to 1.60, the above conditional expressions can be represented as follows.

$$0.39 \, \mu m < d11 < 1.15 \, \mu m$$

$$0.39 \, \mu m < d12 < 2.31 \, \mu m$$

Further, as a way to overlap the first basic structure and the second basic structure together, it is preferable to make the pitches the first basic structure and the second basic structure agree with each other, and to make the positions of all the step differences of the second basic structure and the step differences of the first basic structure agree with each other or to make the positions of all the step differences of the first basic structure and the step differences of the second basic structure agree with each other.

When making the positions of all the step differences of the second basic structure and the step differences of the first basic structure agree with each other as describe above, the values of d11 and d12 of the central-area diffractive structure preferably satisfy the following conditional expressions.

$$0.6 \cdot (\lambda 1/(n-1)) < d11 < 1.5 \cdot (\lambda 1/(n-1))$$

$$0.6 \cdot (\lambda 1/(n-1)) < d12 < 1.5 \cdot (\lambda 1/(n-1))$$

Under the condition that, for example, the values of λ1 ranges from 390 nm to 415 nm (from 0.390 μm to 0.415 μm) and the value of n ranges from 1.54 to 1.60, the above conditional expressions can be represented as follows.

$$0.39 \; \mu m < d11 < 1.15 \; \mu m$$

$$0.39 \; \mu m < d12 < 1.15 \; \mu m$$

More preferably, they satisfy the following conditional expressions.

$$0.9 \cdot (\lambda 1/(n-1)) < d11 < 1.5 \cdot (\lambda 1/(n-1))$$

$$0.9 \cdot (\lambda 1/(n-1)) < d12 < 1.5 \cdot (\lambda 1/(n-1))$$

Under the condition that, for example, the values of λ1 ranges from 390 nm to 415 nm (from 0.390 μm to 0.415 μm) and the value of n ranges from 1.54 to 1.60, the above conditional expressions can be represented as follows.

$$0.59 \; \mu m < d11 < 1.15 \; \mu m$$

$$0.59 \; \mu m < d12 < 1.15 \; \mu m$$

Further, when providing the first optical path difference providing structure by overlapping the first basic structure wherein |X|, |Y|, and |Z| are 1, 1, and 1, respectively, and the second basic structure wherein |L|, |M|, and |N| are 2, 1, and 1, respectively, the first basic structure can make the aberration caused when the wavelength becomes great to be under (under-corrected) (namely, makes wavelength characteristics to be under), and inversely, the second basic structure can make the aberration caused when the wavelength becomes great to be over (over-corrected) (namely, makes wavelength characteristics to be over). Therefore, the wavelength characteristic does not become excessively under or excessively over, and the wavelength characteristics being under at a suitable level can be obtained. The term "the wavelength characteristics being under at a suitable level" preferably corresponds to the condition that the absolute value of aberration in terms of λrms is 150 or less. Thereby, even under the condition that the objective lens is made of plastic, it is preferable from the view point that aberration change resulting from temperature change can be controlled to be small.

From the viewpoint to obtain "the wavelength characteristics being under at a suitable level" as described above, it is preferable that the first basic structure has a contributing rate which is more dominant than that of the second basic structure. From the viewpoint to make the contributing rate of the first basic structure more dominant than that of the second basic structure, it is preferable that the average pitch of the first basic structure is smaller than the average pitch of the second basic structure. In other words, it can be represented that pitches of step differences facing the direction opposite from the optical axis are smaller than pitches of step differences facing the direction of the optical axis, or it can be represented that, in the central-area diffractive structure, the number of step differences facing the direction opposite from the optical axis is greater than the number of step differences facing the direction of the optical axis. Furthermore, the average pitch of the first basic structure is preferably a quarter or less of the average pitch of the second basic structure, and is more preferably one sixth or less of the average pitch of the second basic structure. Providing the average pitch of the fast basic structure which is a quarter or less (more preferably, one sixth or less) of the average pitch of the second basic structure is preferable from the viewpoint to maintain a working distance for a CD additionally to enable to obtain "the wavelength characteristics being under at a suitable level" as described above. In other words, it can be said that the number of step differences facing the direction opposite from the optical axis is preferably four times or more as many as the number of step differences facing the direction of the optical axis, in the central-area diffractive structure. It is more preferable that the number of step differences facing the direction opposite from the optical axis is six times or more as many as that of the step differences facing the direction of the optical axis.

The minimum pitch of the central-area diffractive structure is preferably 15 μm or less, and is more preferably 10 μm or less. The average pitch of the central-area diffractive structure is preferably 30 μm or less, and is more preferably 20 μm or less. Providing such the structure enables to obtain the "the wavelength characteristics being under at a suitable lever" as described above, and to separate a best focus position of necessary light which is used for recording/reproducing information for the third optical disc and a best focus position of unnecessary light which is not used for recording/reproducing information for the third optical disc away from each other to reduce a erroneous detection, where the necessary light and the unnecessary light are generated from the third light flux which has passed through the central-area diffractive structure. Herein, an average pitch is obtained by calculating the total sum of pitches in the central-area diffractive structure and dividing the total sum by the number of step differences in the central-area diffractive structure.

It is preferable that, as for the third light flux which has passed through the central-area diffractive structure, the first-best focus position where a spot formed by the third light flux has the strongest light intensity and the second-best focus position where a spot formed by the third light flux has the second strongest light intensity satisfy the following expression. Herein, a best focus position indicates a position where a beam waist becomes the minimum size within a certain defocused range. The first-best focus position is a best focus position of the necessary light which is used for recording/reproducing information for the third optical disc and the second-best focus position is a best focus position of a light flux with the greatest light amount out of the unwanted light which is not used for recording/reproducing information for the third optical disc:

$$0.05 \leq L/f3 \leq 0.35,$$

where f3 [mm] is a focal length of the third light flux passing through the central-area diffractive structure and forming the first-best focus, and L [mm] is a distance between the first best focus and the second-best focus.

More preferably, the following conditional expression is satisfied.

$$0.10 \leq L/f3 \leq 0.25$$

From the viewpoint that thin and elongated ring-shaped zones are preferable in manufacturing process, the value of ("step difference amount"/pitch) is preferably one or less, and more preferably 0.8 or less, for all the ring-shaped zones in the central-area diffractive structure. Furthermore, the value of ("step difference amount"/pitch) is preferably one or less, and more preferably 0.8 or less, for all the ring-shaped zones in all the diffractive structures.

The image-side numerical aperture of the objective optical element, which is necessary for reproducing and/or recording information for the first optical disc, is defined as NA1. The image-side numerical aperture of the objective optical element, which is necessary for reproducing and/or recording information for the second optical disc, is defined as NA2 (NA1>NA2). The image side numerical aperture of the objective optical element, which is necessary for reproducing and/or recording information for the third optical disc, is defined as NA3 (NA2>NA3). NA1 is preferably 0.6 or more, and 0.9 or less. It is more preferable that NA1 is more preferably 0.85. NA2 is preferably 0.55 or more, and is 0.7 or less. It is especially preferable that NA2 is 0.60 or 0.65. NA3 is preferably 0.4 or more, and is 0.55 or less. It is especially preferable that NA3 is 0.45 or 0.53.

It is preferable that the border of the central area and the peripheral area in the objective optical element is formed in a portion corresponding to the range being 0.9·NA3 or more and being 1.2·NA3 or less (more preferably, 0.95·NA3 or more, and 1.15·NA3 or less) under the condition that the third light flux is used. More preferably, the border of the central area and the peripheral area of the objective optical element is formed in a portion corresponding to NA3. Further, it is preferable that the border of the peripheral area and the most peripheral area of the objective optical element is formed in a portion corresponding to the range being 0.9·NA2 or more, and being 1.2·NA2 or less (more preferably, being 0.95·NA2 or more, and being 1.15·NA2 or less) under the condition that the second light flux is used. More preferably, the border of the peripheral area and the most peripheral area of the objective optical element is formed in a portion corresponding to NA2.

When the third light flux which has passed through the objective optical element is converged on the information recording surface of the third optical disc, it is preferable that spherical aberration has at least one discontinuous portion. In that case, it is preferable that the discontinuous portion exists in the range being 0.9·NA3 or more, and being 1.2·NA3 or less (more preferably, being 0.95·NA3 or more, and being 1.15·NA3 or less) under the condition that the third light flux is used.

Further, corresponding to the use of the optical pickup device, diffraction efficiencies of the central area for respective wavelengths can be set properly. For example, in the case of the optical pickup device which records and reproduces information for the first optical disc, and which just reproduces information for the second and the third optical discs, it is preferable that the diffraction efficiencies of the central area and/or the peripheral area are defined with considering primarily the diffraction efficiencies for the first light flux. On the other hand, in the case of the optical pickup device which only reproduces information for the first optical discs and which records and reproduces information for the second and third optical discs, it is preferable that the diffraction efficiencies of the central area is defined with considering primarily the diffraction efficiencies for the second and third light fluxes and the diffraction efficiencies of the peripheral area is defined with considering primarily the diffraction efficiency for the second light flux.

In any of the above cases, when the following conditional expression (11) is satisfied, the diffraction efficiency of the first light flux calculated by the area-weighted mean can be secured high.

$$\eta 11 \leq \eta 21 \quad (11)$$

In the expression, $\eta 11$ expresses a diffraction efficiency of the first light flux in the central area, and $\eta 21$ expresses a diffraction efficiency of the first light flux in the peripheral area. Hereupon, when the diffraction efficiencies of the central area are defined with considering primarily the light fluxes with the second and the third wavelengths, the diffraction efficiency of the first light flux of the central area is decreased. However, in the case where the numerical aperture of the first optical disc is larger than the numerical aperture of the third optical disc, when considered on the whole effective aperture of the first light flux, the decrease of diffraction efficiency in the central area does not give so much large influence.

Hereupon, diffraction efficiency in the present specification can be defined as follows.

(1) The transmittances of an objective optical element having the same focal length, the same lens thickness, and the same numerical aperture, being formed of the same material, and excluding the central-area and peripheral-area diffractive structures, are measured for the central area and the peripheral area separately. In this case, the transmittance of the central area is measured under the condition that the light flux which enters the peripheral area is shielded, and the transmittance of the peripheral area is measured under the condition that the light flux which enters the central area is shielded.

(2) The transmittances of the objective optical element including the central-area and peripheral-area diffractive structures are measured for the central area and the peripheral area separately.

(3) The diffraction efficiencies of both areas are obtained by dividing the results of (2) by the respective results of (1).

Further, it can be configured to make light use efficiency of two of the first through three light fluxes 65% or more, and to make a light use efficiency of the rest light flux 30% or more and 65% or less. In this case, the light flux exhibiting the light use efficiency being 30% or more and 65% or less is preferably the third light flux.

Incidentally, light use efficiency mentioned here is calculated by LA/LB, where LA represents a light amount within an airy disc of a converged spot formed on an information recording surface of an optical disc by the objective optical element on which the central-area diffractive structure is formed (the intermediate-area diffractive structure and the peripheral-area diffractive structure may be formed thereon), and LB represents a light amount within an airy disc of a converged spot formed on an information recording surface of an optical information recording medium by the objective optical element formed by the same material, having the same focal length, the same thickness on the axis, the same numerical aperture and same wavefront aberration, and excluding the central-area diffractive structure, intermediate-area diffractive structure and the peripheral-area diffractive structure thereon. Meanwhile, an airy disc mentioned here means a circle having radius r' whose center is on the optical axis of a converged spot. It is expressed by r'=0.61·λ/NA.

It is preferable that the following conditional expression (12) is satisfied, where fl (mm) is a focal length of the objective optical element for the first light flux, and the central thickness d (mm) of the objective optical element:

$$0.7 \leq d/fl \leq 1.5 \quad (12)$$

It is more preferable that the following conditional expression (12') is satisfied:

$$1.0 \leq d/fl \leq 1.3 \tag{12'}$$

Providing the above structure enables to maintain a working distance for a CD as the third optical disc without reducing the pitches of the diffractive structure and to make manufacturing of the objective optical element easy, and further enables to maintain high light use efficiency.

The first light flux, the second light flux, and the third light flux may enter the objective optical element as parallel light fluxes, or may enter the objective optical element as divergent light fluxes or convergent light fluxes. Preferably, the image-forming magnification m1 of the objective optical element under the condition that the first light flux enters the objective optical element satisfies the following expression (13).

$$-0.005 \leq m1 \leq 0.005 \tag{13}$$

When the second light flux enters the objective optical element as a parallel or almost parallel light flux, the image-forming magnification m2 of the objective optical element under the condition that the second light flux enters the objective optical element, preferably satisfies the following expression (14).

$$-0.005 \leq m2 \leq 0.005 \tag{14}$$

On the one hand, when the second light flux enters the objective optical element as a divergent light flux, the image-forming magnification m2 of the objective optical under the condition that the second light flux enters the objective optical element, preferably satisfies the expression (14').

$$-0.025 < m2 < 0.00 \tag{14'}$$

When the third light flux enters the objective optical element as a parallel or almost parallel light flux, it is preferable that the image-forming magnification m3 of the objective optical element under the condition that the third light flux enters the objective optical element, preferably satisfies the following expression (15). When the third light flux is a parallel light flux, problems can be caused easily in a tracking operation. However, the present invention can provide excellent tracking characteristics even when the third light flux is a parallel light flux, and realizes recording and/or reproducing of information for three different optical discs.

$$-0.005 \leq m3 \leq 0.005 \tag{15}$$

On the one hand, when the third light flux enters the objective optical element as a divergent light flux, the image-forming manufacture m3 of the objective optical element under the condition that the third light flux enters the objective optical element, preferably satisfies the expression (15').

$$-0.025 < m3 \leq 0.00 \tag{15'}$$

The working distance (WD) of the objective optical element when the third optical disc is used is preferably 0.15 mm or more, and 1.5 mm or less. It is more preferably 0.3 mm or more, and 1.20 mm or less. Next, the WD of the objective optical element when the second optical disc is used is preferably 0.2 mm or more, and 1.3 mm or less. Furthermore, the WD of the objective optical element when the first optical disc is used is preferably 0.25 mm or more, and 1.0 mm or less.

The optical information recording and reproducing apparatus according to the present invention includes an optical disc drive apparatus including the above described optical pickup device.

Herein, the optical disc drive apparatus installed in the optical information recording and reproducing apparatus will be described. There is provided an optical disc drive apparatus employing a system of taking only a tray which can hold an optical disc under the condition that the optical disc is mounted thereon, outside from the main body of the optical information recording and reproducing apparatus in which optical pickup device is housed; and a system of taking out the main body of the optical disc drive apparatus in which the optical pickup device is housed.

The optical information recording and reproducing apparatus using each of the above described systems, is generally provided with the following component members but the members are not limited to them: an optical pickup device housed in a housing; a drive source of the optical pickup device such as seek-motor by which the optical pickup device is moved toward the inner periphery or outer periphery of the optical disc for each housing; traveling means having a guide rail for guiding the optical pickup device toward the inner periphery or outer periphery of the optical disc; and a spindle motor for rotation driving of the optical disc.

The optical information recording and reproducing apparatus employing the former system is preferably provide with, other than these component members, a tray which can hold the optical disc with the optical disc being mounted thereon, and a loading mechanism for slidably moving the tray. The optical information recording and reproducing apparatus employing the latter system preferably does not include the tray and loading mechanism, and it is preferable that each component member is provided in the drawer corresponding to chassis which can be taken out outside.

Advantageous Effect of Invention

According to the present invention, there can be provided an objective optical element and an optical pickup device, where the objective optical element allows recording and/or reproducing information properly for various kinds of discs, by maintaining suitable light use efficiency and controlling deterioration of spherical aberration caused when wavelength of a light flux fluctuates.

DESCRIPTION OF EMBODIMENTS

Figure 5:
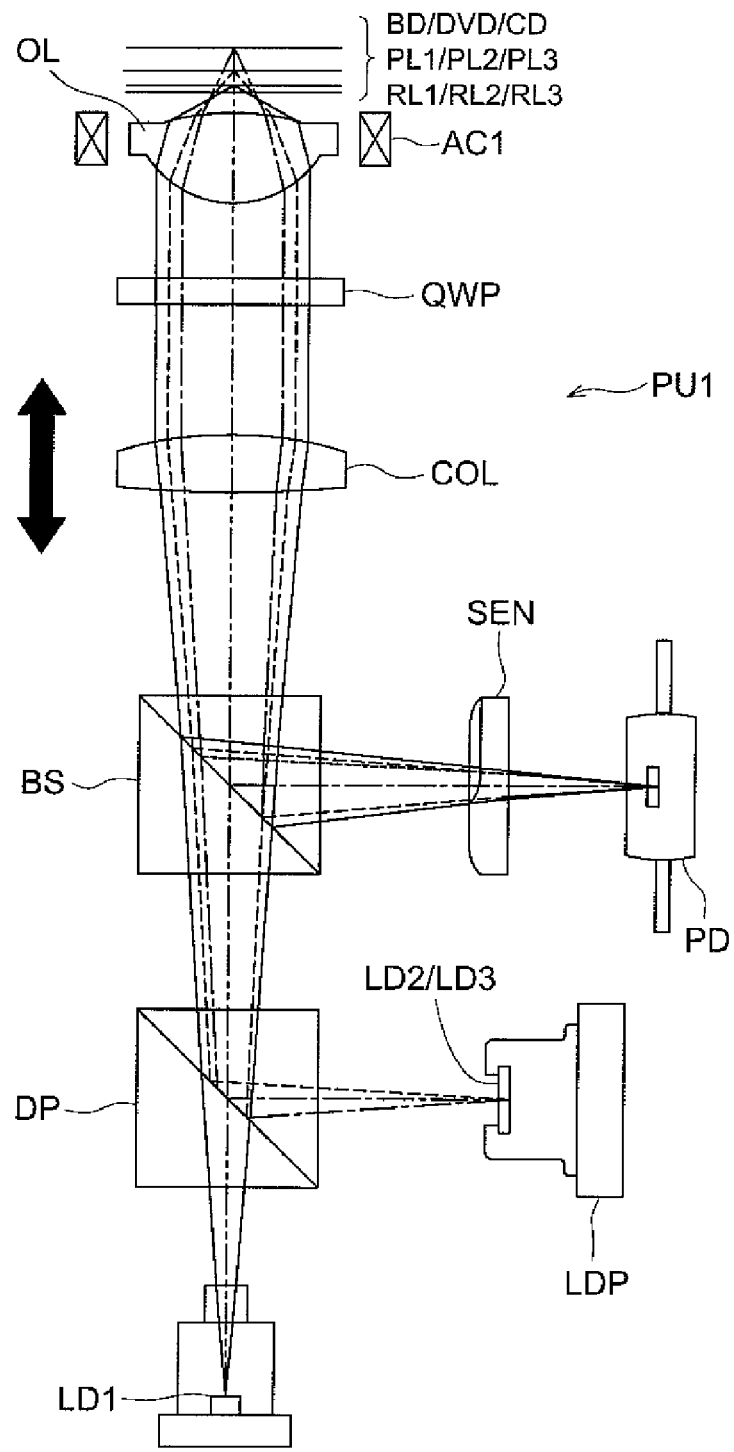
FIG. 5 is a diagram schematically showing the structure of an optical pickup device relating to the invention.

Referring to the drawings, an embodiment of the present invention will be described below. FIG. 5 is a diagram schematically showing a construction of the optical pickup device PU1 of the present embodiment capable of recording and/or reproducing information adequately for a BD, DVD and CD which are different optical discs. The optical pickup device PU1 can be mounted in the optical information recording and reproducing apparatus. Herein, the first optical disc is a BD, the second optical disc is a DVD, and the third optical disc is a CD. Hereupon, the present invention is not limited to the present embodiment.

The optical pickup device PU1 comprises objective optical element OL, quarter wavelength plate QWP, collimation lens COL, polarization beam splitter BS, dichroic prism DP, first semiconductor laser LD1 (the first light source) which emits a laser light flux with wavelength of $\lambda_1$=405 nm (the first light flux) when recording/reproducing information for a BD, and laser unit LDP provided by unitizing second semiconductor laser LD2 (the second light source) which emits a laser light flux with wavelength of $\lambda_2$=660 nm (the second light flux) when recording and/or reproducing information for a DVD and third semiconductor laser LD3 (the third light source) emitting a laser light flux with wavelength of $\lambda_3$=785 nm (the third light flux) when recording and/or reproducing information for a CD. The optical pickup device PU1 further comprises sensor lens SEN and light-receiving element PD as a photodetector.

Figure 1:
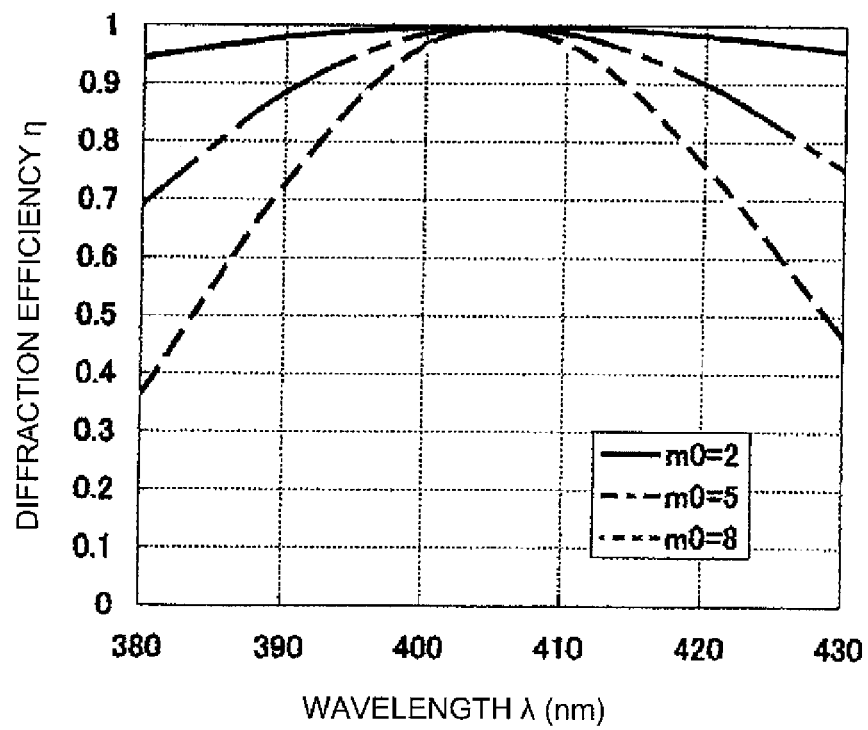
FIG. 1 is a diagram showing an example of deterioration in diffraction efficiency when wavelength fluctuation causes.
Figures 2A, 2B:
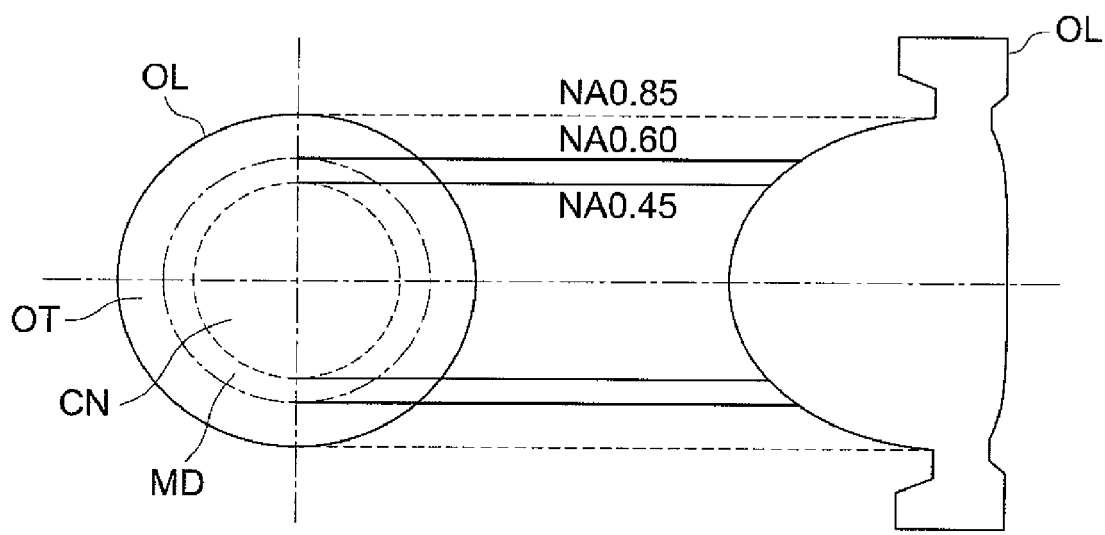
FIG. 2a is a diagram of an example of objective optical element OL relating to the invention which is viewed in the optical axis direction.
FIG. 2b is its sectional view.
Figure 3A:
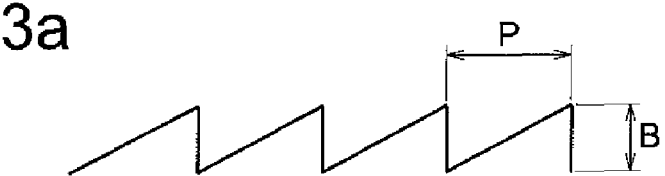
FIGS. 3a to 3d schematically show sectional views of some examples of diffractive structures to be provided on the objective optical element OL relating to the invention.
Figure 3B:
Figure 3C:
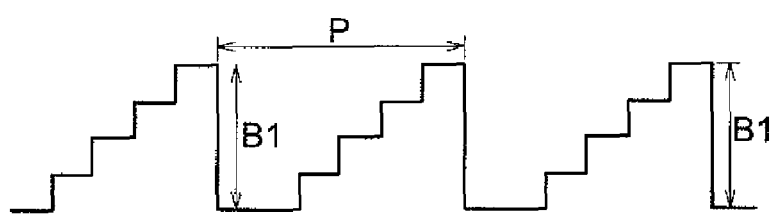
Figure 3D:
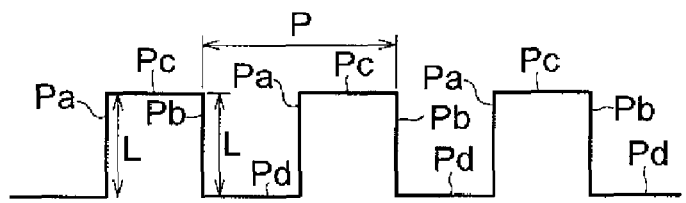
Figure 4:
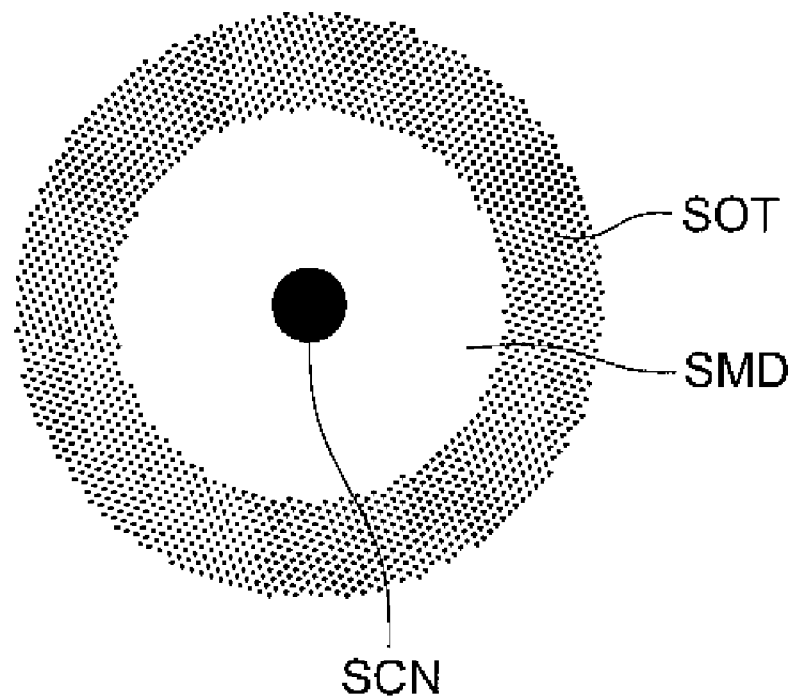
FIG. 4 is a diagram showing a form of a spot formed by the objective optical element relating to the invention.

As shown in FIGS. 2a and 2b, in objective optical element OL being a single lens of the present embodiment, there are formed central area CN including the optical axis, intermediate area MD arranged around the central area, and peripheral area OT further arranged around the intermediate area which are formed concentrically around the optical axis as their center. A central-area diffractive structure is formed in central area CN and an intermediate-area diffractive structure is formed in intermediate area MD, which are not illustrated in the figures. Further, peripheral area OT is provided as an area on which a diffractive structure is formed or an area which does not include a diffractive structure and is composed of a refractive surface.

Assuming that SA3($\lambda_{11}$), SA5($\lambda_{11}$), SA3($\lambda_{12}$), and SA5($\lambda_{12}$) are third-order spherical aberrations and fifth-order aberrations obtained when light fluxes with two different wavelengths $\lambda_{11}$ and $\lambda_{12}$ being within the range from 375 nm to 435 nm (where $\lambda_{11}<\lambda_{12}$ and $\lambda_{12}-\lambda_{11}$=5 nm) enter objective optical element OL and wavefront aberrations are measured in units of $\lambda$rms, the following conditional expressions (1) and (5) are satisfied.

$$0.18 > \Delta SA3 > \Delta SA5 > 0 \quad (1)$$

$$0 \leq |N^*d^*(n-1)/\lambda_1| \leq 50 \quad (5),$$

In the expressions, $$\Delta SA3 = |SA3(\lambda_{12}) - SA3(\lambda_{11})|,$$

$$\Delta SA5 = |SA5(\lambda_{12}) - SA5(\lambda_{11})|,$$

d is an average step difference [nm] of ring-shaped zones of the peripheral-area diffractive structure, n is a refractive index of a material of the objective optical element, $\lambda_1$ is a wavelength [nm] of the first light flux, and N is a number of the ring-shaped zones of the peripheral-area diffractive structure.

It is more preferable that the expression $\Delta SA3:\Delta SA5=\alpha:1$ (where $4 \leq \alpha \leq 9$) is satisfied.

Assuming that W($\lambda_{11}$) and W($\lambda_{12}$) are wavefront aberrations obtained when light fluxes with wavelength $\lambda_{11}$ and wavelength $\lambda_{12}$ ($\lambda_{11}<\lambda_{12}$) enter the objective optical element and wavefront aberrations are measured, the following expressions are preferably satisfied.

$$\Delta W = W(\lambda_{12}) - W(\lambda_{11})$$

$$\Delta W = C_{SAL}(20\rho^6 + 6\beta\rho^4 - 6(3+\beta)\rho^2 + (4+\beta)) + SAH \quad (2)$$

In the expressions, W is a wavefront aberration (at the best focus) [$\lambda$rms], $\rho$ is a relative pupil diameter (under an assumption that a value at a center of an effective diameter is zero and a value at a height of an outermost position is one), $C_{SAL}$ is a coefficient of low-order spherical aberrations, SAH is spherical aberrations with seventh or more orders [$\lambda$rms], and $\beta$ is an arbitral value within a range of $0 \leq \beta \leq 4$.

A divergent light flux as the first light flux ($\lambda_1$=405 nm) emitted from blue-violet semiconductor laser diode LD1, as illustrated by solid lines, passes through dichroic prism DP and passes through polarization beam splitter BS. After that, the light flux passes through collimation lens COL and becomes a parallel light flux. The parallel light flux is converted from linear polarized light into circular polarized light by quarter wavelength plate QWP. The diameter of the converted light flux is regulated by a stop which is not illustrated, and the resulting light flux enters objective optical element OL. The light flux which is converged by the central area, the intermediate area, and the peripheral area, is formed into a spot on information recording surface RL1 of a BD through protective substrate PL1 with the thickness of 0.1 mm.

The reflection light flux which is modulated on the information recording surface RL1 by information pits passes through objective optical element OL and the stop which is not illustrated again. After that, the light flux is converted from circular polarized light into linear polarized light by quarter wavelength plate QWP. Then, collimation lens COL converts the light flux into a convergent light flux. The convergent light flux is reflected by polarization beam splitter BS and is converged through sensor lens SEN on the light receiving surface of the light-receiving element PD. Then, information recorded in a BD can be read based on the output signal of light-receiving element PD, by focusing or tracking objective optical element OL using two-axis actuator AC1. Herein, when wavelength fluctuation is caused in the first light flux, spherical aberration generated because of that can be corrected by changing the position of collimation lens COL as a magnification changing means in the direction of the optical axis so as to change a divergent angle or convergent angle of a light flux entering the objective optical element. When a BD includes plural information recording surfaces, aberrations generated corresponding to the difference in thickness of protective substrates of the information recording surfaces may be corrected by changing the position of collimation lens COL in the direction of the optical axis so as to change a divergent angle or convergent angle of a light flux entering the objective optical element.

A divergent light flux as the second light flux ($\lambda_2$=660 nm) emitted from semiconductor laser LD2 of laser unit LDP, as illustrated by dotted lines, is reflected by dichroic prism DP and passes through polarization beam splitter BS and collimation lens COL. After that, the light flux is converted from circular polarized light into linear polarized light by quarter wavelength plate QWP. The resulting light flux enters into objective optical element OL. Herein, the light flux converged by the central area and the intermediate area of the objective optical element OL (the light flux passing through the peripheral area is made into flare light, and forms the peripheral spot portion), is formed into the central spot portion on information recording surface RL2 of a DVD through the protective substrate PL2 with a thickness of 0.6 mm.

The reflection light flux which is modulated on the information recording surface RL2 by information pits passes through objective optical element OL again. After that, the light flux is converted from circular polarized light into linear polarized light by quarter wavelength plate QWP. Then, collimation lens COL converts the light flux into a convergent light flux. The convergent light flux is reflected by polarization beam splitter BS and is converged through sensor lens SEN on the light receiving surface of light-receiving element PD. Then, information recorded in a DVD can be read based on the output signal of light-receiving element PD.

A divergent light flux as the third light flux ($\lambda_3$=785 nm) emitted from semiconductor laser LD3 of laser unit LDP, as illustrated by dashed-and-dotted lines, is reflected by dichroic prism DP and passes through polarization beam splitter BS and collimation lens COL. After that, the light flux is converted from circular polarized light into linear polarized light by quarter wavelength plate QWP. The resulting light flux enters into objective optical element OL. Herein, the light flux converged by the central area of the objective optical element OL (the light flux passing through the intermediate area and the peripheral area is made into flare light, and forms the peripheral spot portion), is formed into the central spot portion on information recording surface RL3 of a CD through the protective substrate PL3 with a thickness of 1.2 mm.

The reflection light flux which is modulated on the information recording surface RL3 by information pits passes through objective optical element OL again. After that, the light flux is converted from circular polarized light into linear polarized light by quarter wavelength plate QWP. Then, collimation lens COL converts the light flux into a convergent light flux. The convergent light flux is reflected by polarization beam splitter BS and is converged through sensor lens SEN on the light receiving surface of light-receiving element PD. Then, information recorded in a CD can be read based on the output signal of light-receiving element PD.

EXAMPLES

Hereinafter, Examples which can be used for the aforesaid embodiment will be explained as follows. In the followings (including lens data in tables), the power of 10 will be expressed as by using "E" (for example, $2.5 \times 10^{-3}$ will be expressed as 2.5E-3). The optical surfaces of the objective optical element are respectively formed into aspheric surfaces which are regulated by an expression obtained by substituting coefficients shown in the tables to the expression of Math 2.

$$X(h) = \frac{(h^2/r)}{1 + \sqrt{1 - (1+\kappa)(h/r)^2}} + \sum_{i=0}^{10} A_{2i} h^{2i} \quad \text{[Math 2]}$$

Herein, X(h) represents the axis along the optical axis (the direction of traveling light is defined as a positive direction), $\kappa$ is a conic constant, $A_i$ is an aspheric surface coefficient, h is the height from the optical axis, and r is the paraxial curvature radius.

In Examples using a diffractive structure, an optical path difference provided by the di active structure for the light flux with each wavelength is defined by an expression obtained by substituting the coefficients shown in the tables into the optical path difference function represented by Math 3.

$$\Phi = m\lambda \Sigma B_{2i} h^{2i} \quad \text{[Math. 3]}$$

(Unit:mm)

In the expression, m is the number of diffraction order, $\lambda$ is a wavelength of an incident light flux, $B_2$, is a coefficient of the optical path difference function, and h is a height from the optical axis.

Figure 6A:
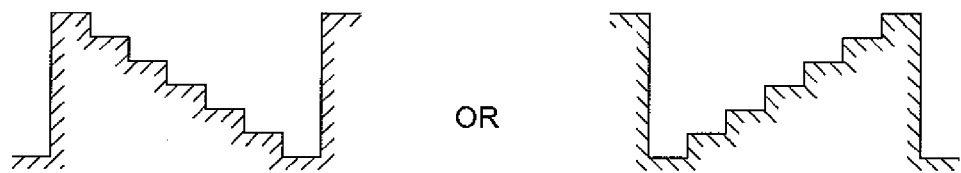
FIGS. 6a to 6d show sectional views of exemplified diffractive structures employed in Examples.
Figure 6B:
Figure 6C:
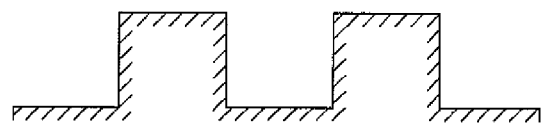
Figure 6D:
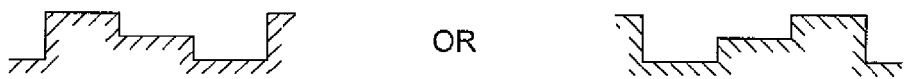

FIGS. 6a to 6d show sectional shapes of exemplified diffractive structures employed in Examples. FIG. 6a shows a seven-level step structure as a 3λ-area structure (1/−2/−3) of Example 1 which will be shown later. FIG. 6b shows a five-level step structure as a 3λ-area structure (1/−1/−2) of Example 2 which will be shown later. FIG. 6c shows a two-level step structure as a 3λ-area structure (0/0/1) of Example 3 which will be shown later. FIG. 6d shows a three-level step structure as a 2λ-area structure (0/−1/*) of Example 3 which will be shown later.

In all the Examples, the following expressions hold, where $\lambda_{12}$ is 410 nm and $\lambda_{11}$ is 405 nm.

$$\Delta SA3 = |SA3(\lambda_{12}) - SA3(\lambda_{11})|$$

$$\Delta SA5 = |SA5(\lambda_{12}) - SA5(\lambda_{11})|$$

In Examples 1 to 4, both of the value of $SA3(\lambda_{12}) - SA3(\lambda_{11})$ and the value of $SA5(\lambda_{12}) - SA5(\lambda_{11})$ are positive. On the other hand, in Example 5, both of the value of $SA3(\lambda_{12}) - SA3(\lambda_{11})$ and the value of $SA5(\lambda_{12}) - SA5(\lambda_{11})$ are negative.

Example 1

Table 1 shows lens data of Example 1. In Example 1, the central-area diffractive structure has a seven-level structure shown in FIG. 6a. A first-order diffracted light flux has a maximum diffraction-light amount among diffracted light fluxes generated when the first light flux enters the central-area diffractive structure, a minus-second-order diffracted light flux has a maximum diffraction-light amount among diffracted light fluxes generated when the second light flux enters the central-area diffractive structure, and a minus-third-order diffracted light flux has a maximum diffraction-light amount among diffracted light fluxes generated when the third light flux enters the central-area diffractive structure. The intermediate-area diffractive structure has a three-level step structure shown in FIG. 6d. A zeroth-order diffracted light flux has a maximum diffraction-light amount among diffracted light fluxes generated when the first light flux enters the intermediate-area diffractive structure, and a minus-first-order diffracted light flux has a maximum diffraction-light amount among diffracted light fluxes generated when the second light flux enters the second basic structure. The peripheral-area diffractive structure may has any one of a blaze structure and a step structure, and is a structure that a second-order diffracted light flux has a maximum diffraction-light amount among diffracted light fluxes generated when the first light flux enters the peripheral-area diffractive structure.

In Example 1, ΔSA3 is 0.060 λrms and ΔSA5 is 0.002 λrms, which satisfy the above described expression (1). The material of the objective optical element is plastic. The value of $|N^*d^*(n-1)/\lambda_1|$ is 8 and it satisfies the above described expression (5).

TABLE 1

| (Example 1) | | | | | | | |
|---|---|---|---|---|---|---|---|
| Focal length of the objective lens | | $f_1$ = 2.20 mm | | $f_2$ = 2.36 mm | | $f_3$ = 2.44 mm | |
| Numerical aperture | | NA1: 0.85 | | NA2: 0.60 | | NA3: 0.47 | |
| Magnification | | m1: 0 | | m2: −1/189 | | m3: −1/36 | |
| i-th surface | ri | di (405 nm) | ni (405 nm) | di (660 nm) | ni (660 nm) | di (785 nm) | ni (785 nm) |
| 0 | | ∞ | | 450.00 | | 89.00 | |
| 1 (Stop diameter) | | 0.0 (φ3.74 mm) | | 0.0 (φ2.86 mm) | | 0.0 (φ2.37 mm) | |
| 2-1 | 1.4760 | 2.670 | 1.5592 | 2.670 | 1.5397 | 2.670 | 1.5363 |

TABLE 1-continued (Example 1)

| | | | | | | | | |
|---|---|---|---|---|---|---|---|---|
| 2-2 | 1.4580 | | | | | | | |
| 2-3 | 1.5149 | | | | | | | |
| 3 | −2.7553 | 0.694 | | 0.587 | | 0.376 | | |
| 4 | ∞ | 0.0875 | 1.6196 | 0.600 | 1.5773 | 1.200 | 1.5709 | |
| 5 | ∞ | | | | | | | |

| | Surface No. | 2-1 | 2-2 | 2-3 | 3 |
|---|---|---|---|---|---|
| | Area | h ≦ 1.190 | 1.190 ≦ h ≦ 1.434 | 1.434 ≦ h ≦ 1.87 | — |
| Aspheric surface coefficient | κ | −7.0931E−01 | −6.3289E−01 | −6.2123E−01 | −4.6840E+01 |
| | A0 | 0.0000E+00 | −7.0823E−03 | 4.0539E−03 | 0.0000E+00 |
| | A4 | 9.1173E−03 | 8.4553E−03 | 1.1945E−02 | 8.8950E−02 |
| | A6 | 8.5249E−03 | −1.7568E−03 | −1.1383E−04 | −9.2978E−02 |
| | A8 | −1.5985E−02 | 2.7992E−03 | 2.8043E−03 | 7.7776E−02 |
| | A10 | 1.8088E−02 | −1.2008E−03 | −1.5393E−03 | −4.4989E−02 |
| | A12 | −8.9726E−03 | 2.4437E−04 | 2.2720E−04 | 1.4056E−02 |
| | A14 | 1.0780E−03 | 2.2226E−04 | 2.3820E−04 | −1.7533E−03 |
| | A16 | 6.7692E−05 | −2.0287E−04 | −1.6602E−04 | −9.5890E−06 |
| | A18 | 4.1562E−04 | 5.9236E−05 | 4.5324E−05 | 0.0000E+00 |
| | A20 | −1.6181E−04 | −5.2971E−06 | −4.6289E−06 | 0.0000E+00 |
| Optical path difference function | Diffraction order m | 1/−2/−3 | 0/−1/* | 2/*/* | |
| | B2 | −8.2634E+00 | −9.5340E−+00 | 1.2526E−02 | |
| | B4 | 5.8703E−01 | −4.1041E−00 | 6.3119E−02 | |
| | B6 | −3.1806E−01 | −2.0713E+00 | 1.0011E−03 | |
| | B8 | 1.4808E−01 | 1.8892E+00 | −5.0437E−03 | |
| | B10 | −2.9436E−02 | −3.4836E−01 | −5.7434E−03 | |

Wavelength characteristic: +5 nm
ΔSA3: 0.060
ΔSA5: 0.002
|d(n−1)/λ$_1$ * N| = 8

Example 2

Table 2 shows lens data of Example 2. In Example 2, the central-area diffractive structure has a five-level structure shown in FIG. 6b. A first-order diffracted light flux has a maximum diffraction-light amount among diffracted light fluxes generated when the first light flux enters the central-area diffractive structure, a minus-first-order diffracted light flux has a maximum diffraction-light amount among diffracted light fluxes generated when the second light flux enters the central-area diffractive structure, and a minus-second-order diffracted light flux has a maximum diffraction-light amount among diffracted light fluxes generated when the third light flux enters the central-area diffractive structure. The intermediate-area diffractive structure has a three-level step structure shown in FIG. 6d. A zeroth-order diffracted light flux has a maximum diffraction-light amount among diffracted light fluxes generated when the first light flux enters the intermediate-area diffractive structure, and a minus-first-order diffracted light flux has a maximum diffraction-light amount among diffracted light fluxes generated when the second light flux enters the second basic structure. The peripheral-area diffractive structure may has any one of a blaze structure and a step structure, and is a structure that a fourth-order diffracted light flux has a maximum diffraction-light amount among diffracted light fluxes generated when the first light flux enters the peripheral-area diffractive structure.

In Example 2, ΔSA3 is 0.062 λrms and ΔSA5 is 0.013 λrms, which satisfy the above described expression (1). The material of the objective optical element is plastic. The value of |N*d*(n−1)/λ$_1$| is 12 and it satisfies the above described expression (5).

TABLE 2

(Example 2)

| Focal length of the objective lens | f$_1$ = 2.20 mm | | f$_2$ = 2.35 mm | | f$_3$ = 2.45 mm | |
|---|---|---|---|---|---|---|
| Numerical aperture | NA1: 0.85 | | NA2: 0.61 | | NA3: 0.46 | |
| Magnification | m1: 0 | | m2: −1/63 | | m3: −1/89 | |

| i-th surface | ri | di (405 nm) | ni (405 nm) | di (660 nm) | ni (660 nm) | di (785 nm) | ni (785 nm) |
|---|---|---|---|---|---|---|---|
| 0 | ∞ | | | 150.0 | | 220.0 | |
| 1 (Stop diameter) | 0.0 (φ3.74 mm) | | | 0.0 (φ2.87 mm) | | 0.0 (φ2.30 mm) | |
| 2-1 | 1.4848 | 2.680 | 1.5592 | 2.680 | 1.5397 | 2.680 | 1.5363 |
| 2-2 | 1.4633 | | | | | | |
| 2-3 | 1.5024 | | | | | | |
| 3 | −2.7532 | 0.685 | | 0.585 | | 0.395 | |
| 4 | ∞ | 0.0875 | 1.6196 | 0.600 | 1.5773 | 1.100 | 1.5709 |
| 5 | ∞ | | | | | | |

TABLE 2-continued (Example 2)

| Surface No. | | 2-1 | 2-2 | 2-3 | 3 |
|---|---|---|---|---|---|
| | Area | h ≦ 1.155 | 1.155 ≦ h ≦ 1.450 | 1.450 ≦ h ≦ 1.87 | — |
| Aspheric surface coefficient | κ | −5.7045E−01 | −6.2289E−01 | −6.3685E−01 | −4.7663E+01 |
| | A0 | 0.0000E+00 | −1.3522E−02 | 4.3417E−03 | 0.0000E+00 |
| | A4 | 5.6828E−03 | 9.2482E−03 | 8.6397E−03 | 9.0804E−02 |
| | A6 | −5.9469E−04 | −8.9197E−04 | −3.5075E−04 | −9.6905E−02 |
| | A8 | 3.1229E−03 | 2.1990E−03 | 2.9495E−03 | 7.7081E−02 |
| | A10 | −3.6558E−03 | −1.2799E−03 | −1.5013E−03 | −4.3984E−02 |
| | A12 | 1.5246E−03 | 2.1205E−04 | 2.2836E−04 | 1.4353E−02 |
| | A14 | 6.2448E−04 | 2.4175E−04 | 2.3563E−04 | −2.0115E−03 |
| | A16 | −3.5972E−04 | −1.6387E−04 | −1.6702E−04 | 1.5954E−05 |
| | A18 | −2.5117E−04 | 4.6512E−05 | 4.5239E−05 | 0.0000E+00 |
| | A20 | 1.2493E−04 | −5.6202E−06 | −4.5598E−06 | 0.0000E+00 |
| Optical path difference function | Diffraction order m | 1/−1/−2 | 0/−1/* | 4/*/* | |
| | B2 | −1.1904E+01 | −1.7973E+00 | −2.4246E+00 | |
| | B4 | 5.8012E−01 | −1.3271E+00 | −1.3384E+00 | |
| | B6 | 2.1642E−01 | 1.7843E+00 | 1.1618E+00 | |
| | B8 | −4.5926E−01 | −7.5784E−01 | −4.0106E−01 | |
| | B10 | 1.8665E−01 | 1.1876E−01 | 4.9987E−02 | |

Wavelength characteristic: +5 nm
ΔSA3: 0.062
ΔSA5: 0.013
$|d(n-1)/\lambda_1 * N| = 12$

Example 3

Table 3 shows lens data of Example 3. In Example 3, the central-area diffractive structure has a five-level structure shown in FIG. 6b. A first-order diffracted light flux has a maximum diffraction-light amount among diffracted light fluxes generated when the first light flux enters the central-area diffractive structure, a minus-first-order diffracted light flux has a maximum diffraction-light amount among diffracted light fluxes generated when the second light flux enters the central-area diffractive structure, and a minus-second-order diffracted light flux has a maximum diffraction-light amount among diffracted light fluxes generated when the third light flux enters the central-area diffractive structure. The intermediate-area diffractive structure has a three-level step structure shown in FIG. 6d. A zeroth-order diffracted light flux has a maximum diffraction-light amount among diffracted light fluxes generated when the first light flux enters the intermediate-area diffractive structure, and a minus-first-order diffracted light flux has a maximum diffraction-light amount among diffracted light fluxes generated when the second light flux enters the intermediate-area diffractive structure. The peripheral-area diffractive structure may has any one of a blaze structure and a step structure, and is a structure that a fourth-order diffracted light flux has a maximum diffraction-light amount among diffracted light fluxes generated when the first light flux enters the peripheral-area diffractive structure.

In Example 3, ΔSA3 is 0.054 λrms and ΔSA5 is 0.009 λrms, which satisfy the above described expression (1), and ΔSA3 ΔSA5=6:1 holds. The material of the objective optical element is plastic. The value of $|N*d*(n-1)/\lambda_1|$ is 16 and it satisfies the above described expression (5).

Further, the present example satisfies the conditional expression (2) defined by $\Delta W = C_{SAL}(20\rho^6 + 6\beta\rho^4 - 6(3+\beta)\rho^2 + (4+\beta)) + SAH$. The value of $C_{SAL}$ is 0.009 when β=1, and the value of SAH is 0.016 λrms, which satisfy the above expressions (3) and (4).

TABLE 3

(Example 3)

| Focal length of the objective lens | $f_1$ = 2.20 mm | | $f_2$ = 2.35 mm | | $f_3$ = 2.45 mm | |
|---|---|---|---|---|---|---|
| Numerical aperture | NA1: 0.85 | | NA2: 0.61 | | NA3: 0.46 | |
| Magnification | m1: 0 | | m2: −1/63 | | m3: −1/89 | |
| i-th surface | ri | di (405 nm) | ni (405 nm) | di (658 nm) | ni (658 nm) | di (783 nm) | ni (783 nm) |
| 0 | ∞ | | | 150.0 | | 220.0 | |
| 1 (Stop diameter) | | 0.0 (φ3.74 mm) | | 0.0 (φ2.87 mm) | | 0.0 (φ2.30 mm) | |
| 2-1 | 1.4848 | 2.680 | 1.5592 | 2.680 | 1.5397 | 2.680 | 1.5363 |
| 2-2 | 1.4633 | | | | | | |
| 2-3 | 1.5024 | | | | | | |
| 3 | −2.7532 | 0.685 | | 0.585 | | 0.395 | |
| 4 | ∞ | 0.0875 | 1.6196 | 0.600 | 1.5773 | 1.100 | 1.5709 |
| 5 | ∞ | | | | | | |

TABLE 3-continued (Example 3)

| Surface No. | | 2-1 | 2-2 | 2-3 | 3 |
|---|---|---|---|---|---|
| | Area | h ≦ 1.155 | 1.155 ≦ h ≦ 1.450 | 1.450 ≦ h ≦ 1.87 | — |
| Aspheric surface coefficient | κ | −5.7122E−01 | −6.2310E−01 | −6.3676E−01 | −4.7296E+01 |
| | A0 | 0.0000E+00 | −1.3568E−02 | 4.1590E−03 | 0.0000E+00 |
| | A4 | 5.5923E−03 | 9.2430E−03 | 8.8214E−03 | 9.1402E−02 |
| | A6 | −3.2321E−04 | −9.1128E−04 | −3.8453E−04 | −9.7518E−02 |
| | A8 | 2.7872E−03 | 2.1917E−03 | 2.9252E−03 | 7.6829E−02 |
| | A10 | −3.4535E−03 | −1.2786E−03 | −1.5061E−03 | −4.3926E−02 |
| | A12 | 1.4793E−03 | 2.1422E−04 | 2.2844E−04 | 1.4449E−02 |
| | A14 | 6.2452E−04 | 2.4350E−04 | 2.3595E−04 | −2.0459E−03 |
| | A16 | −3.5971E−04 | −1.6359E−04 | −1.6694E−04 | 1.6308E−05 |
| | A18 | −2.5117E−04 | 4.5302E−05 | 4.5225E−05 | 0.0000E+00 |
| | A20 | 1.2493E−04 | −5.3221E−06 | −4.5863E−06 | 0.0000E+00 |
| Optical path difference function | Diffraction order m | 1/−1/−2 | 0/−1/* | 4/*/* | |
| | B2 | −1.1951E+01 | −1.8039E+01 | −2.3803E+00 | |
| | B4 | 8.0748E−01 | −1.2487E+00 | −1.3403E−+00 | |
| | B6 | −2.0631E−01 | 1.7765E+00 | 1.1645E+00 | |
| | B8 | −1.2169E−01 | −7.7367E−01 | −4.0263E−01 | |
| | B10 | 9.0048E−02 | 1.2303E−01 | 4.8046E−02 | |

Wavelength characteristic: +5 nm
ΔSA3: 0.054
ΔSA5: 0.009
SAH: 0.016
$C_{SAL}$: 0.009
$|d(n−1)/\lambda_1 * N| = 16$
α: 1

Example 4

Tables 4 and 5 show lens data of Example 4. In Example 4, the central-area diffractive structure is formed by a diffractive structure of a two-level step type shown in FIG. 6c and a blaze diffractive structure which are overlapped together. A zeroth-order diffracted light flux has a maximum diffraction-light amount among diffracted light fluxes generated when the first light flux enters the two-level-step diffractive structure, a zeroth-order diffracted light flux has a maximum diffraction-light amount among diffracted light fluxes generated when the second light flux enters the two-level-step diffractive structure, and a ±first-order diffracted light flux has a maximum diffraction-light amount among diffracted light fluxes generated when the third light flux enters the second-level-step diffractive structure. A second-order diffracted light flux has a maximum diffraction-light amount among diffracted light fluxes generated when the first light flux enters the blaze diffractive structure, a first-order diffracted light flux has a maximum diffraction-light amount among diffracted light fluxes generated when the second light flux enters the blaze diffractive structure, and a first-order diffracted light flux has a maximum diffraction-light amount among diffracted light fluxes generated when the third light flux enters the blaze diffractive structure. The intermediate-area diffractive structure has a blaze diffractive structure. A second-order diffracted light flux has a maximum diffraction-light amount among diffracted light fluxes generated when the first light flux enters the intermediate-area diffractive structure, and a first-order diffracted light flux has a maximum diffraction-light amount among diffracted light fluxes generated when the second light flux enters the intermediate-area diffractive structure. The peripheral-area diffractive structure has a blaze structure, and a second-order diffracted light flux has a maximum diffraction-light amount among diffracted light fluxes generated when the first light flux enters the peripheral-area diffractive structure.

In Example 4, ΔSA3 is 0.102 λrms and ΔSA5 is 0.012 λrms, which satisfy the above described expression (1), and ΔSA3:ΔSA5=8.5:1 holds. The material of the objective optical element is plastic. The value of $|d(n−1)/\lambda_1*N|$ is 16 and it satisfies the above described expression (5).

Further, the present example satisfies the conditional expression (2) defined by $\Delta W = C_{SAL}(20\rho^6 + 6\beta\rho^4 - 6(3+\beta)\rho^2 + (4+\beta)) + SAH$. The value of $C_{SAL}$ is 0.012 when β=3.5, and the value of SAH is 0.025 λrms, which satisfy the above expressions (3) and (4).

TABLE 4

(Example 4)

| Focal length of the objective lens | $f_1 = 2.20$ mm | $f_2 = 2.28$ mm | $f_3 = 2.45$ mm |
|---|---|---|---|
| Numerical aperture | NA1: 0.85 | NA2: 0.60 | NA3: 0.47 |
| Magnification | m1: 0 | m2: −1/65 | m3: −1/63 |

| i-th surface | ri | di (405 nm) | ni (405 nm) | di (660 nm) | ni (660 nm) | di (785 nm) | ni (785 nm) |
|---|---|---|---|---|---|---|---|
| 0 | | ∞ | | 150.0 | | 155.0 | |
| 1 (Stop diameter) | | 0.0 (φ3.74 mm) | | 0.0 (φ2.87 mm) | | 0.0 (φ2.30 mm) | |

TABLE 4-continued (Example 4)

| | | | | | | | |
|---|---|---|---|---|---|---|---|
| 2-1 | 1.5606 | 2.680 | 1.5592 | 2.680 | 1.5397 | 2.680 | 1.5363 |
| 2-2 | 1.5623 | | | | | | |
| 2-3 | 1.5641 | | | | | | |
| 2-4 | 1.5664 | | | | | | |
| 2-5 | 1.4916 | | | | | | |
| 3 | −2.7124 | 0.690 | | 0.476 | | 0.414 | |
| 4 | ∞ | 0.0875 | 1.6196 | 0.600 | 1.5773 | 1.100 | 1.5709 |
| 5 | ∞ | | | | | | |

TABLE 5

| Surface No. | | 2-1 | 2-2 | 2-3 | 2-4 | 2-5 | 3 |
|---|---|---|---|---|---|---|---|
| Area | | h ≤ 1.190 | 1.190 ≤ h ≤ 1.264 | 1.264 ≤ h ≤ 1.315 | 1.315 ≤ h ≤ 1.3725 | 1.3725 ≤ h ≤ 1.87 | |
| Aspheric surface coefficient | κ | −5.7034E−01 | −5.7034E−01 | −5.7034E−01 | −5.7034E−01 | −6.3791E−01 | −4.0969E+01 |
| | A0 | 0.0000E+00 | −3.5725E−03 | −7.1387E−03 | −1.0446E−02 | −1.0899E−02 | 0.0000E+00 |
| | A4 | 1.4958E−02 | 1.4958E−02 | 1.4958E−02 | 1.4958E−02 | 1.0947E−02 | 9.4599E−02 |
| | A6 | 2.2061E−03 | 2.2061E−03 | 2.2061E−03 | 2.2061E−03 | −1.0242E−03 | −1.0089E−01 |
| | A8 | 2.1796E−03 | 2.1796E−03 | 2.1796E−03 | 2.1796E−03 | 2.7913E−03 | 7.7343E−02 |
| | A10 | −1.5590E−03 | −1.5590E−03 | −1.5590E−03 | −1.5590E−03 | −1.4413E−03 | −4.3086E−02 |
| | A12 | 3.8539E−04 | 3.8539E−04 | 3.8539E−04 | 3.8539E−04 | 2.5039E−04 | 1.4794E−02 |
| | A14 | 4.6294E−04 | 4.6294E−04 | 4.6294E−04 | 4.6294E−04 | 2.3562E−04 | −2.6805E−03 |
| | A16 | −3.3896E−04 | −3.3896E−04 | −3.3896E−04 | −3.3896E−04 | −1.6776E−04 | 1.8470E−04 |
| | A18 | 7.7910E−05 | 7.7910E−05 | 7.7910E−05 | 7.7910E−05 | 4.4700E−05 | 0.0000E+00 |
| | A20 | −3.8230E−06 | −3.8230E−06 | −3.8230E−06 | −3.8230E−06 | −4.4740E−06 | 0.0000E+00 |
| First optical path difference function | Diffraction order m | 2/1/1 | 2/1/1 | 2/1/1 | 2/1/1 | 2/1/1 | |
| | B2 | −1.6279E+01 | −1.6279E+01 | −1.6279E+01 | −1.6279E+01 | −6.6701E−01 | |
| | B4 | 6.2385E+00 | 6.2385E+00 | 6.2385E+00 | 6.2385E+00 | 1.1269E−01 | |
| | B6 | 1.5918E+00 | 1.5918E+00 | 1.5918E+00 | 1.5918E+00 | 7.0819E−02 | |
| | B8 | −4.5760E−01 | −4.5760E−01 | −4.5760E−01 | −4.5760E−01 | 2.1757E−02 | |
| | B10 | 1.5384E−01 | 1.5384E−01 | 1.5384E−01 | 1.5384E−01 | 4.6060E−03 | |
| Second optical path difference function | Diffraction order m | 0/0/1 | | | | | |
| | B2 | 3.0327E+01 | | | | | |
| | B4 | −2.7763E+00 | | | | | |
| | B6 | 1.2914E+00 | | | | | |
| | B8 | −3.3242E−01 | | | | | |
| | B10 | 5.1159E−02 | | | | | |

Wavelength characteristic: +5 nm
ΔSA3: 0.102
ΔSA5: 0.012
SAH: 0.025
$C_{SAL}$: 0.012
$|d(n − 1)/\lambda_1 * N| = 16$
α: 3.5

Example 5

Table 6 shows lens data of Example 5. In Example 5, the central-area di active structure is a structure formed by two types of blaze diffractive structures which are overlapped together, where the structure has been described to be formed by the first basic structure and the second basic structure which are overlapped together. The first basic structure is a blaze diffractive structure wherein step differences face the direction opposite to the optical axis. Diffracted light fluxes whose absolute diffraction order is first has a maximum diffraction-light amount among diffracted light fluxes generated when the first light flux enters the first basic structure, diffracted light fluxes whose absolute diffraction order is first has a maximum diffraction-light amount among diffracted light fluxes generated when the second light flux enters the first basic structure, and diffracted light fluxes whose absolute diffraction order is first has a maximum diffraction-light amount among diffracted light fluxes generated when the third light flux enters the first basic structure. The second basic structure is a blaze diffractive structure wherein step differences face the direction of the optical axis. Diffracted light fluxes whose absolute diffraction order is second has a maximum diffraction-light amount among diffracted light fluxes generated when the first light flux enters the second basic structure, diffracted light fluxes whose absolute diffraction order is first has a maximum diffraction light amount among diffracted light fluxes generated when the second light flux enters the second basic structure, and diffracted light fluxes whose absolute diffraction order is first has a maximum diffraction-light amount among diffracted light fluxes generated when the third light flux enters the second basic structure. The intermediate-area diffractive structure is a structure wherein a blaze structure which is similar as the above first basic structure and another blaze structure which is similar as the above second basic structure are overlapped together, and a two-level-step diffractive structure is further overlapped with them. A zeroth-order diffracted light flux has a maximum diffraction-light amount among diffracted light fluxes generated when the first light flux enters the two-level-step diffractive structure, a zeroth-order diffracted light flux has a maximum diffraction-light amount among diffracted light fluxes generated when the second light flux enters the two-level-step diffractive structure, and a ±first-order diffracted light flux has a maximum diffraction-light amount among diffracted light fluxes generated when the third light flux enters the two-level-step diffractive structure. The peripheral-area diffractive structure has a blaze structure, and a second-order diffracted light flux has a maximum diffraction-light amount among diffracted light fluxes generated when the first light flux enters the peripheral-area diffractive structure.

In Example 5, $\Delta SA3$ is 0.105 $\lambda$rms and $\Delta SA5$ is 0.024 $\lambda$rms, which satisfy the above described expression (1), and $\Delta SA3$:$\Delta SA5=4.4:1$ holds. The material of the objective optical element is plastic. The value of $|d(n-1)/\lambda_1 *N|$ is 45 and it satisfies the above described expression (5).

REFERENCE SIGNS LIST

AC1 Two-axis actuator
BS Polarization beam splitter
DP Dichroic prism
CN Central area
COL Collimation lens
LD1 Semiconductor laser
LD2 Semiconductor laser
LD3 Semiconductor laser
LDP Laser unit
MD Peripheral area
OL Objective optical element
OT Most peripheral area

TABLE 6

(Example 5)

| Focal length of the objective lens | $f_1$ = 2.20 mm | | $f_2$ = 2.38 mm | | $f_3$ = 2.45 mm | |
|---|---|---|---|---|---|---|
| Numerical aperture | NA1: 0.85 | | NA2: 0.60 | | NA3: 0.47 | |
| Magnification | m1: 0 | | m2: 0 | | m3: 0 | |
| i-th surface | ri | di (405 nm) | ni (405 nm) | di (660 nm) | ni (660 nm) | di (785 nm) | ni (785 nm) |
| 0 | ∞ | | | | | | |
| 1 (Stop diameter) | 0.0 ($\phi$3.74 mm) | | 0.0 ($\phi$2.87 mm) | | 0.0 ($\phi$2.30 mm) | | |
| 2-1 | 1.3099 | 2.670 | 1.5414 | 2.670 | 1.5225 | 2.670 | 1.5193 |
| 2-2 | 1.5097 | | | | | | |
| 2-3 | 1.4723 | | | | | | |
| 3 | −2.3669 | 0.721 | | 0.646 | | 0.359 | |
| 4 | ∞ | 0.0875 | 1.6196 | 0.600 | 1.5773 | 1.200 | 1.5709 |
| 5 | ∞ | | | | | | |

| | Surface No. | 2-1 | 2-2 | 2-3 | 3 |
|---|---|---|---|---|---|
| | Area | h ≦ 1.180 | 1.180 ≦ h ≦ 1.45 | 1.45 ≦ h ≦ 1.87 | |
| Aspheric surface coefficient | κ | −8.7226E−01 | −3.7413E−01 | −5.9930E−01 | −3.3091E+01 |
| | A0 | 0.0000E+00 | 2.4521E−02 | 2.2268E−02 | 0.0000E+00 |
| | A4 | 7.9383E−03 | 2.3786E−02 | 1.9406E−02 | 1.0060E−01 |
| | A6 | 5.4165E−03 | −1.8940E−03 | −1.0124E−04 | −9.9722E−02 |
| | A8 | 3.1408E−04 | −3.0942E−04 | 2.4046E−03 | 7.7657E−02 |
| | A10 | −1.3516E−03 | −2.2047E−03 | −1.5974E−03 | −4.3120E−02 |
| | A12 | 5.1208E−04 | 5.9886E−04 | 2.3273E−04 | 1.4491E−02 |
| | A14 | 7.0800E−04 | 3.2379E−04 | 2.3920E−04 | −2.5798E−03 |
| | A16 | −7.9609E−04 | −2.2751E−04 | −1.6547E−04 | 1.8060E−04 |
| | A18 | 3.2163E−04 | 8.4526E−05 | 4.5018E−05 | 0.0000E+00 |
| | A20 | −4.3814E−05 | −1.5640E−05 | −4.6358E−06 | 0.0000E+00 |
| First optical path difference function | Diffraction order m | 1/1/1 | 1/1/1 | 2/1/1 | |
| | B2 | 6.3821E+01 | 6.4208E+01 | 1.4185E+01 | |
| | B4 | −6.0360E+00 | −6.3479E+00 | 1.7360E+00 | |
| | B6 | 3.1232E+00 | 2.4210E+00 | −1.7979E−01 | |
| | B8 | −1.3062E+00 | −5.1565E−01 | −1.0132E−01 | |
| | B10 | 2.5156E−01 | 5.8699E−02 | −4.6009E−02 | |
| Second optical path difference function | Diffraction order m | 2/1/1 | 2/1/1 | — | |
| | B2 | −7.6263E+00 | −7.6722E+00 | — | |
| | B4 | −3.7264E+00 | −4.1548E+00 | — | |
| | B6 | 1.5761E+00 | 1.4111E+00 | — | |
| | B8 | −9.7167E−01 | −3.8603E−01 | — | |
| | B10 | 2.3713E−01 | 7.2573E−02 | — | |
| Third optical path difference function | Diffraction order m | — | 0/0/1 | — | |
| | B2 | — | −9.4827E+01 | — | |
| | B4 | — | 1.9720E+02 | — | |
| | B6 | — | −1.5525E+02 | — | |
| | B8 | — | 5.5362E+01 | — | |
| | B10 | — | −7.4420E+00 | — | |

Wavelength characteristic: +5 nm
$\Delta SA3$: 0.105
$\Delta SA5$: 0.024
$|d(n-1)/\lambda_1 *N| = 45$
$\alpha$: 4.4

PD Light-receiving element
PL1 Protective substrate
PL2 Protective substrate
PL3 Protective substrate
PU1 Optical pickup device
QWP Quarter wavelength plate
RL1 Information recording surface
RL2 Information recording surface
RL3 Information recording surface
SCN Central spot portion
SMD Intermediate spot portion
SEN Sensor lens
SOT Peripheral spot portion

The invention claimed is:

1. An objective optical element for use in an optical pickup device comprising a first light source emitting a first light flux with a wavelength $\lambda_1$ (375 nm$\leq\lambda_1\leq$435 nm), a second light flux emitting a second light flux with a wavelength $\lambda_2$ ($\lambda_1<\lambda_2$), and an objective optical element, wherein the optical pickup device records and/or produces information by converging the first light flux onto an information recording surface of a first optical disc including a protective layer with a thickness t1 and converging the second light flux onto an information recording surface of a second optical disc including a protective layer with a thickness t2 (t1<t2) to record and/or reproduce information, using the objective optical element, wherein the objective optical element is a single lens and comprises a central area including an optical axis and a peripheral area arranged around the central area, wherein a central-area diffractive structure is arranged in the central area, the first light flux which has passed through the central area is converged on the information recording surface of the first optical disc so that information can be recorded and/or reproduced, the second light flux which has passed through the central area is converged on the information recording surface of the second optical disc so that information can be recorded and/or reproduced, the first light flux which has passed through the peripheral area is converged on the information recording surface of the first optical disc so that information can be recorded and/or reproduced, the second light flux which has passed through the peripheral area is not converged on the information recording surface of the second optical disc so that information can be recorded and/or reproduced, and the objective optical element satisfies the following expressions, where SA3($\lambda_{11}$), SA5($\lambda_{11}$), SA3($\lambda_{12}$), and SA5($\lambda_{12}$) are third-order spherical aberrations in units of $\lambda$rms and fifth-order aberrations obtained when light fluxes with two different wavelengths $\lambda_{11}$ and $\lambda_{12}$ which are within the range of the wavelength $\lambda_1$ and satisfy $\lambda_{11}<\lambda_{12}$ and $\lambda_{12}-\lambda_{11}=5$ nm enter the objective optical element and wavefront aberrations are measured:

$$0.18 > \Delta SA3 > \Delta SA5 > 0 \tag{1}$$

wherein $\Delta SA3=|SA3(\lambda_{12})-SA3(\lambda_{11})|$ and $\Delta SA5=|SA5(\lambda_{12})-SA5(\lambda_{11})|$.

2. The objective optical element of claim 1 satisfying the following expression:

$$0.13 > \Delta SA3 > 0.03 > \Delta SA5 > 0 \tag{1'}$$

3. The objective optical element of claim 1 satisfying the following expression:

$$0.18 > \Delta SA3 > 0.06 > \Delta SA5 > 0 \tag{1''}$$

4. The objective optical element of claim 1 satisfying $\Delta SA3:\Delta SA5=\alpha:1$, wherein the value of $\alpha$ satisfies $4\leq\alpha\leq9$.

5. The objective optical element of claim 1, wherein the objective optical element is used for the optical pickup device further comprising a third light source emitting a third light flux with a wavelength $\lambda_3$ ($\lambda_2<\lambda_3$), wherein the optical pickup device records and/or produces information by converging the third light flux onto an information recording surface of a third optical disc including a protective layer with a thickness t3 (t2<t3) to record and/or reproduce information, using the objective optical element, wherein the objective optical element further comprises an intermediate area arranged between the central area and the peripheral area, the first light flux which has passed through the central area is converged on the information recording surface of the first optical disc so that information can be recorded and/or reproduced, the second light flux which has passed through the central area is converged on the information recording surface of the second optical disc so that information can be recorded and/or reproduced, the third light flux which has passed through the central area is converged on the information recording surface of the third optical disc so that information can be recorded and/or reproduced, the first light flux which has passed through the intermediate area is converged on the information recording surface of the first optical disc so that information can be recorded and/or reproduced, the second light flux which has passed through the intermediate area is converged on the information recording surface of the second optical disc so that information can be recorded and/or reproduced, the third light flux which has passed through the intermediate area is not converged on the information recording surface of the third optical disc so that information can be recorded and/or reproduced, the first light flux which has passed through the peripheral area is converged on the information recording surface of the first optical disc so that information can be recorded and/or reproduced, the second light flux which has passed through the peripheral area is not converged on the information recording surface of the second optical disc so that information can be recorded and/or reproduced, and the third light flux which has passed through the peripheral area is not converged on the information recording surface of the third optical disc so that information can be recorded and/or reproduced.

6. The objective optical element claim 1 satisfying the following expressions, where W($\lambda_{11}$) and W($\lambda_{12}$) are wavefront aberrations obtained when light fluxes with the wavelength $\lambda_{11}$ and the wavelength $\lambda_{12}$ ($\lambda_{11}<\lambda_{12}$) enter the objective optical element and wavefront aberrations are measured:

$$\Delta W = W(\lambda_{12}) - W(\lambda_{11})$$

$$\Delta W = C_{SAL}(20\rho^6 + 6\beta\rho^4 - 6(3+\beta)\rho^2 + (4+\beta)) + SAH \tag{2}$$

where W is a wavefront aberration at a best focus in units of $\lambda$rms, $\rho$ is a relative pupil diameter under an assumption that a value at a center of an effective diameter is 0 and a value at a height of an outermost position is 1, $C_{SAL}$ is a coefficient of low-order spherical aberrations, SAH is spherical aberrations with seventh and more orders in units of $\lambda$rms, and $\beta$ is an arbitral value within a range of $0\leq\beta\leq4$.

7. The objective optical element of claim 6, satisfying the following expression:

$$-0.030 \leq SAH \leq 0.030 \quad (3).$$

8. The objective optical element of claim 6, satisfying the following expression:

$$0.00 < C_{SAL} < 0.03 \quad (4).$$

9. The objective optical element of claim 1
wherein a diffracted light flux with a diffraction order other than a zero-th order has a maximum diffracted-light amount among diffracted light fluxes generated when the first light flux enters the central-area diffractive structure.

10. The objective optical element of claim 1 satisfying the following expression:

$$0 \leq |N*d(n-1)/\lambda_1| \leq 50 \quad (5),$$

where d is an average of step differences of ring-shaped zones [nm] of a diffractive structure arranged in the peripheral area,
n is a refractive index of a material of the objective optical element at the wavelength $\lambda_1$, and
N is a number of the ring-shaped zones of the diffractive structure arranged in the peripheral area.

11. The objective optical element of claim 10,
wherein the peripheral area is a refractive surface, in the objective optical element.

12. The objective optical element of claim 10,
wherein the peripheral area comprises a diffractive structure, in the objective optical element.

13. An optical pickup device comprising:
a first light source emitting a first light flux with a wavelength $\lambda_1$ (375 nm $\leq \lambda_1 \leq$ 435 mm);
a second light flux emitting a second light flux with a wavelength $\lambda_2$ ($\lambda_1 < \lambda_2$), and
an objective optical element,
wherein the optical pickup device records and/or produces information by converging the first light flux onto an information recording surface of a first optical disc including a protective layer with a thickness t1 and converging the second light flux onto an information recording surface of a second optical disc including a protective layer with a thickness t2 (t1<t2) to record and/or reproduce information, using the objective optical element,
wherein the objective optical element is a single lens and comprises a central area including an optical axis and a peripheral area arranged around the central area, wherein a central-area diffractive structure is arranged in the central area,
the first light flux which has passed through the central area is converged on the information recording surface of the first optical disc so that information can be recorded and/or reproduced,
the second light flux which has passed through the central area is converged on the information recording surface of the second optical disc so that information can be recorded and/or reproduced,
the first light flux which has passed through the peripheral area is converged on the information recording surface of the first optical disc so that information can be recorded and/or reproduced,
the second light flux which has passed through the peripheral area is not converged on the information recording surface of the second optical disc so that information can be recorded and/or reproduced, and the objective optical element satisfies the following expressions, where SA3($\lambda_{11}$), SA5($\lambda_{11}$), SA3($\lambda_{12}$), and SA5($\lambda_{12}$) are third-order spherical aberrations in units of $\lambda$rms and fifth-order aberrations obtained when light fluxes with two different wavelengths $\lambda_{11}$ and $\lambda_{12}$ which are within the range of the wavelength $\lambda_1$ and satisfy $\lambda_{11} < \lambda_{12}$ and $\lambda_{12} - \lambda_{11} = 5$ nm enter the objective optical element and wavefront aberrations are measured:

$$0.18 > \Delta SA3 > \Delta SA5 > 0 \quad (1)$$

wherein $\Delta SA3 = |SA3(\lambda_{12}) - SA3(\lambda_{11})|$ and $\Delta SA5 = |SA5(\lambda_{12}) - SA5(\lambda_{11})|$.

14. The optical pickup device of claim 13, further comprising
a third light source emitting a third light flux with a wavelength $\lambda_3$ ($\lambda_2 < \lambda_3$), wherein the optical pickup device records and/or produces information by converging the third light flux onto an information recording surface of a third optical disc including a protective layer with a thickness t3 (t2<t3) to record and/or reproduce information, using the objective optical element,
wherein the objective optical element further comprises an intermediate area arranged between the central area and the peripheral area,
the first light flux which has passed through the central area is converged on the information recording surface of the first optical disc so that information can be recorded and/or reproduced,
the second light flux which has passed through the central area is converged on the information recording surface of the second optical disc so that information can be recorded and/or reproduced,
the third light flux which has passed through the central area is converged on the information recording surface of the third optical disc so that information can be recorded and/or reproduced,
the first light flux which has passed through the intermediate area is converged on the information recording surface of the first optical disc so that information can be recorded and/or reproduced,
the second light flux which has passed through the intermediate area is converged on the information recording surface of the second optical disc so that information can be recorded and/or reproduced,
the third light flux which has passed through the intermediate area is not converged on the information recording surface of the third optical disc so that information can be recorded and/or reproduced,
the first light flux which has passed through the peripheral area is converged on the information recording surface of the first optical disc so that information can be recorded and/or reproduced,
the second light flux which has passed through the peripheral area is not converged on the info nation recording surface of the second optical disc so that information can be recorded and/or reproduced, and
the third light flux which has passed through the peripheral area is not converged on the information recording surface of the third optical disc so that information can be recorded and/or reproduced.

15. The optical pickup device of claim 13, further comprising a magnification changing means arranged at a position between the first light source and the objective optical element.

* * * * *